(12) United States Patent
Jobs et al.

(10) Patent No.: US 8,799,813 B2
(45) Date of Patent: Aug. 5, 2014

(54) METHOD AND SYSTEM FOR PROVIDING AN EMBEDDED APPLICATION TOOL BAR

(75) Inventors: Steven P. Jobs, Palo Alto, CA (US); Donald J. Lindsay, Mountain View, CA (US); Tim Wasko, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1532 days.

(21) Appl. No.: 10/741,598

(22) Filed: Dec. 22, 2003

(65) Prior Publication Data

US 2004/0174396 A1    Sep. 9, 2004

Related U.S. Application Data

(62) Division of application No. 09/477,739, filed on Jan. 5, 2000, now Pat. No. 6,686,938.

(51) Int. Cl.
G06F 3/048 (2013.01)
(52) U.S. Cl.
USPC ............................ 715/810; 715/779; 715/856
(58) Field of Classification Search
USPC ........................... 715/810, 779, 856; 345/853
See application file for complete search history.

(56) References Cited

U.S. PATENT DOCUMENTS

| | | |
|---|---|---|
| 4,698,525 A | 10/1987 | Tavana et al. |
| 4,698,625 A | 10/1987 | Mccaskill et al. |
| 4,755,811 A | 7/1988 | Slavin et al. |
| 4,790,028 A | 12/1988 | Ramage |

(Continued)

FOREIGN PATENT DOCUMENTS

| | | |
|---|---|---|
| EP | 0476972 A2 | 3/1992 |
| EP | 0575146 A2 | 12/1993 |

(Continued)

OTHER PUBLICATIONS

Myers, A Taxonomy of Window Manager User Interfaces, IEEE Comp. Graphics and Appl., Sep. 1988, pp. 65-84.*

(Continued)

*Primary Examiner* — Boris Pesin
*Assistant Examiner* — Matthew Ell
(74) *Attorney, Agent, or Firm* — Schwegman Lundberg & Woessner, P.A.

(57) ABSTRACT

A method and system for providing menu tools directly from an operating system includes a computer system having a user interface including a display, a cursor, and a cursor control device, and an operating system. Menu tools are provided to one or more application windows. A menu item associated with a menu tool represents an available operating system function and an interactive icon associated with the menu item may be placed in a toolbar region in one of the application windows for access to the function. A special operating mode is activated for selecting menu items for use in the toolbar and making the function associated with the menu item available to the application by moving the menu item to the toolbar region. The menu item is represented as an interactive icon once the special operating mode is activated. The operating system function associated with the menu item is made available to the application window directly from the operating system by interaction with the icon. The menu item is further represented as an icon in regions of additional application windows which may either be active or subsequently instantiated through inheritance. The special operating mode is activated from a special key on an input device. Menu items are displayed along with menu tools corresponding to available operating system functions.

15 Claims, 9 Drawing Sheets

(56) References Cited

U.S. PATENT DOCUMENTS

| | | |
|---|---|---|
| 4,984,152 A | 1/1991 | Muller |
| 5,021,976 A | 6/1991 | Wexelblat et al. |
| 5,027,110 A | 6/1991 | Chang et al. |
| 5,053,758 A | 10/1991 | Cornett et al. |
| 5,119,079 A | 6/1992 | Hube et al. |
| 5,146,556 A | 9/1992 | Hullot et al. |
| 5,155,806 A | 10/1992 | Hoeber et al. |
| 5,201,034 A | 4/1993 | Matsuura et al. |
| 5,276,785 A | 1/1994 | Mackinlay et al. |
| 5,295,243 A | 3/1994 | Robertson et al. |
| 5,339,390 A | 8/1994 | Robertson et al. |
| 5,341,466 A | 8/1994 | Perlin et al. |
| 5,359,703 A | 10/1994 | Robertson et al. |
| 5,459,488 A | 10/1995 | Geiser |
| 5,530,796 A * | 6/1996 | Wang ............................ 715/762 |
| 5,546,529 A | 8/1996 | Bowers et al. |
| 5,559,301 A | 9/1996 | Bryan, Jr. et al. |
| 5,564,004 A | 10/1996 | Grossman et al. |
| 5,565,888 A | 10/1996 | Selker |
| 5,579,037 A | 11/1996 | Tahara et al. |
| 5,581,670 A | 12/1996 | Bier et al. |
| 5,588,105 A | 12/1996 | Foster et al. |
| 5,615,384 A | 3/1997 | Allard et al. |
| 5,617,114 A | 4/1997 | Bier et al. |
| 5,619,632 A | 4/1997 | Lamping et al. |
| 5,623,588 A | 4/1997 | Gould |
| 5,638,523 A | 6/1997 | Mullet et al. |
| 5,640,498 A | 6/1997 | Chew |
| 5,644,737 A | 7/1997 | Tuniman et al. |
| 5,644,739 A * | 7/1997 | Moursund ..................... 715/840 |
| 5,657,049 A * | 8/1997 | Ludolph et al. ............... 715/856 |
| 5,664,128 A | 9/1997 | Bauer |
| 5,670,984 A | 9/1997 | Robertson et al. |
| 5,678,034 A | 10/1997 | Chew |
| 5,689,287 A | 11/1997 | Mackinlay et al. |
| 5,704,050 A | 12/1997 | Redpath |
| 5,736,974 A | 4/1998 | Selker |
| 5,745,096 A | 4/1998 | Ludolph et al. |
| 5,745,110 A | 4/1998 | Ertemalp |
| 5,748,927 A | 5/1998 | Stein et al. |
| 5,757,358 A | 5/1998 | Osga |
| 5,757,371 A | 5/1998 | Oran et al. |
| 5,786,820 A | 7/1998 | Robertson |
| 5,812,111 A | 9/1998 | Fuji et al. |
| 5,812,805 A * | 9/1998 | Kitayama et al. ............. 715/840 |
| 5,824,933 A | 10/1998 | Gabriel |
| 5,825,348 A | 10/1998 | Ludolph et al. |
| 5,825,357 A | 10/1998 | Malamud et al. |
| 5,877,751 A | 3/1999 | Kanemitsu et al. |
| 5,914,714 A * | 6/1999 | Brown ............................ 715/866 |
| 5,914,716 A | 6/1999 | Rubin et al. |
| 5,920,316 A | 7/1999 | Oran et al. |
| 5,943,679 A | 8/1999 | Niles et al. |
| 5,956,021 A | 9/1999 | Kubota et al. |
| 5,956,035 A | 9/1999 | Sciammarella et al. |
| 5,973,694 A | 10/1999 | Steele et al. |
| 5,986,639 A | 11/1999 | Ozawa et al. |
| 6,002,402 A * | 12/1999 | Schacher ........................ 715/810 |
| 6,014,138 A * | 1/2000 | Cain et al. ..................... 715/826 |
| 6,054,990 A | 4/2000 | Tran |
| 6,072,486 A * | 6/2000 | Sheldon et al. ................ 715/835 |
| 6,073,036 A | 6/2000 | Heikkinen et al. |
| 6,133,915 A * | 10/2000 | Arcuri et al. ................... 715/779 |
| 6,141,010 A * | 10/2000 | Hoyle ............................ 715/854 |
| 6,169,538 B1 | 1/2001 | Nowlan et al. |
| 6,177,941 B1 * | 1/2001 | Haynes et al. ................ 715/810 |
| 6,208,342 B1 | 3/2001 | Mugura et al. |
| 6,232,972 B1 | 5/2001 | Arcuri et al. |
| 6,256,649 B1 | 7/2001 | Mackinlay et al. |
| 6,310,633 B1 | 10/2001 | Graham |
| 6,414,700 B1 | 7/2002 | Kurtenbach et al. |
| 6,456,306 B1 | 9/2002 | Chin et al. |
| 6,469,722 B1 | 10/2002 | Kinoe et al. |
| 6,496,206 B1 | 12/2002 | Mernyk et al. |
| 6,621,532 B1 * | 9/2003 | Mandt ............................ 348/841 |
| 6,686,938 B1 | 2/2004 | Jobs et al. |
| 6,774,919 B2 * | 8/2004 | Miller et al. ................... 715/721 |
| 6,883,143 B2 * | 4/2005 | Driskell ......................... 715/763 |
| 7,036,087 B1 * | 4/2006 | Odom ............................ 715/779 |
| 7,185,333 B1 * | 2/2007 | Shafron ......................... 717/173 |
| 7,434,177 B1 | 10/2008 | Ording et al. |
| 7,526,738 B2 | 4/2009 | Ording et al. |
| 2003/0058286 A1 * | 3/2003 | Dando ........................... 345/853 |
| 2005/0251755 A1 * | 11/2005 | Mullins et al. ................ 715/779 |
| 2012/0023427 A1 | 1/2012 | Ording et al. |
| 2012/0023434 A1 | 1/2012 | Ording et al. |

FOREIGN PATENT DOCUMENTS

| | | |
|---|---|---|
| EP | 0651543 A2 | 5/1995 |
| EP | 0727730 A2 | 8/1996 |
| EP | 0283995 A2 | 9/1998 |
| EP | 0869425 A2 | 10/1998 |
| EP | 0609030 B1 | 6/1999 |
| JP | 57-041731 A | 3/1982 |
| JP | 59-057336 A | 4/1984 |
| JP | 02-153415 A | 6/1990 |
| JP | 03-113578 A | 5/1991 |
| JP | 05-061633 A | 3/1993 |
| JP | 05-165459 A | 7/1993 |
| JP | 06-274586 A | 9/1994 |
| JP | 07-320051 A | 12/1995 |
| JP | 07-320079 A | 12/1995 |
| JP | 08-016353 A | 1/1996 |
| JP | 08-185265 A | 7/1996 |
| JP | 08-227341 A | 9/1996 |
| JP | 09-251341 A | 9/1997 |
| JP | 10-043387 A | 2/1998 |
| JP | 10-269022 A | 10/1998 |
| JP | 11-272391 A | 10/1999 |
| JP | 2000-242383 A | 9/2000 |
| WO | WO-94/29788 A1 | 12/1994 |
| WO | WO-98/09270 A1 | 3/1998 |

OTHER PUBLICATIONS

Courter, Gini. "Mastering Microsoft Office 2000". Copyright—1999. Professional Edition, pp. 10-23.
"Microsoft Office 2000". Copyright 1983-1999.
"Microsoft Internet Explorer 5.0 (Screenshots)", Microsoft Corporation, 4 pages, 1999.
How to Create a Shortcut on the Desktop, Jan. 19, 2007, Revision 1.3, [online], [retrieved on Apr. 21, 2009]. Retrieved from the Internet: <URL: http://support.microsoft.com/kb/140443>.
"U.S. Appl. No. 09/467,074, Advisory Action mailed Feb. 10, 2003", 3 pgs.
"U.S. Appl. No. 09/467,074, Appeal Decision mailed Feb. 8, 2008", 24 pgs.
"U.S. Appl. No. 09/467,074, Declaration of Bas Ording with Exhibits A-C dated Nov. 28, 2001", 6 pgs.
"U.S. Appl. No. 09/467,074, Examiner's Answer to Appeal Brief mailed Feb. 9, 2005", 27 pgs.
"U.S. Appl. No. 09/467,074, Examiner's Answer to Appeal Brief mailed Oct. 5, 2005", 26 pgs.
"U.S. Appl. No. 09/467,074, Final Office Action mailed Jul. 23, 2004", 29 pgs.
"U.S. Appl. No. 09/467,074, Final Office Action mailed Sep. 25, 2002", 18 pgs.
"U.S. Appl. No. 09/467,074, Final Office Action mailed Oct. 23, 2003", 20 pgs.
"U.S. Appl. No. 09/467,074, Non Final Office Action mailed Feb. 26, 2002", 15 pgs.
"U.S. Appl. No. 09/467,074, Non Final Office Action mailed Apr. 28, 2003", 21 pgs.
"U.S. Appl. No. 09/467,074, Notice of Allowance mailed May 27, 2008", 7 pgs.
"U.S. Appl. No. 09/467,074, Preliminary Amendment filed Apr. 22, 2003", 5 pgs.
"U.S. Appl. No. 09/467,074, Response filed Jan. 27, 2003 to Final Office Action mailed Sep. 25, 2002", 6 pgs.

(56) References Cited

OTHER PUBLICATIONS

"U.S. Appl. No. 09/467,074, Response filed Apr. 8, 2005 to Examiner's Answer to Appeal Brief mailed Feb. 9, 2005", 4 pgs.
"U.S. Appl. No. 09/467,074, Response filed Apr. 8, 2008 to Appeal Decision mailed Feb. 8, 2008", 30 pgs.
"U.S. Appl. No. 09/467,074, Response filed May 24, 2004 to Final Office Action mailed Oct. 23, 2003", 40 pgs.
"U.S. Appl. No. 09/467,074, Response filed Jun. 26, 2002 to Non Final Office Action mailed Feb. 26, 2002", 22 pgs.
"U.S. Appl. No. 09/467,074, Response filed Jul. 28, 2003 to Non Final Office Action mailed Apr. 28, 2003", 37 pgs.
"U.S. Appl. No. 09/467,074, Response filed Oct. 25, 2004 to Final Office Action mailed Jul. 23, 2004", 37 pgs.
"U.S. Appl. No. 11/892,153, Notice of Allowance mailed Dec. 16, 2008", 7 pgs.
"U.S. Appl. No. 12/410,354, Applicant's Summary of Examiner Interview filed May 19, 2011", 2 pgs.
"U.S. Appl. No. 12/410,354, Examiner Interview Summary mailed May 17, 2011", 3 pgs.
"U.S. Appl. No. 12/410,354, Non Final Office Action mailed Oct. 27, 2010", 6 pgs.
"U.S. Appl. No. 12/410,354, Non Final Office Action mailed Nov. 17, 2009", 6 pgs.
"U.S. Appl. No. 12/410,354, Notice of Allowance mailed Jun. 3, 2011", 7 pgs.
"U.S. Appl. No. 12/410,354, Notice of Allowance mailed Jul. 14, 2010", 4 pgs.
"U.S. Appl. No. 12/410,354, Preliminary Amendment filed Oct. 16, 2009", 6 pgs.
"U.S. Appl. No. 12/410,354, Response filed Apr. 27, 2011 to Non Final Office Action mailed Oct. 27, 2010", 9 pgs.
"U.S. Appl. No. 12/410,354, Response filed May 17, 2010 to Non Final Office Action mailed Nov. 17, 2009", 11 pgs.
"U.S. Appl. No. 13/252,227, Response filed Feb. 7, 2013 to Restriction Requirement mailed Jan. 8, 2013", 8 pgs.
"U.S. Appl. No. 13/252,227, Restriction Requirement mailed Jan. 8, 2013", 7 pgs.
"U.S. Appl. No. 13/252,232, Response filed Feb. 7, 2013 to Restriction Requirement mailed Jan. 24, 2013", 9 pgs.
"U.S. Appl. No. 13/252,232, Restriction Requirement mailed Jan. 24, 2013", 7 pgs.
"European Application Serial No. 0917601.5, Extended European Search Report mailed Dec. 22, 2009", 10 pgs.
"European Application Serial No. 0917601.5, Office Action mailed Aug. 12, 2010", 1 pg.
"European Application Serial No. 0917601.5, Response filed Dec. 22, 2010 to Office Action mailed Aug. 12, 2010", 14 pgs.
"European Application Serial No. 09176016,5, Extended European Search Report mailed Dec. 22, 2009", 10 pgs.
"International Application Serial No. PCT/US2000/32453, International Preliminary Examination Report mailed Sep. 10, 2002", 9 pgs.
"International Application Serial No. PCT/US2000/32453, International Search Report mailed Jun. 12, 2001", 6 pgs.
"Japanese Application Serial No. 2001-547240, Questioning issued Apr. 5, 2010 and English translation of Examiner's Pre-Review Report", (2010), 4 pgs.
"JP 10-269022A", *Patent Abstracts of Japan*. vol. 1999, No. 1, (Jan. 29, 1999).
"Magnification Technology", NCIP Staff, [online] Retrieved from the Internet: <URL: http://www2.edc.org.ncip/library/vi/magnifi.htm>, (1994), 7 pgs.
Ahlberg, C., et al., "Visual Information Seeking: Tight Coupling Dynamic Query Filters with Starfield Displays", *Human Factors in Computing Systems*, (Apr. 24-28, 1998), 313-480.
Alberg, C., et al., "The Alphaslider: A Compact and Rapid Selector", *Human Factors in Computing Systems: CHI '94*, Boston, Massachusetts, USA, (Apr. 24-28, 1994), 365-371.
Anderson, P., et al., "Frustum: A Novel Distortion-Oriented Display for Demanding Applications", *Proceedings of SPIE—The International Society for Optical Engineering*, vol. 2656, (1996), 150-156.

Baeza-Yates, R., "Visualization of Large Answers in Text Databases", Proceedings of the *Workshop on Advanced Visual Interfaces (AVI '96)*, (1996), 101-107.
Barthel, B. et al., "Information Access for Visually Impaired Persons: Do We Still Keep a "Document" in "Documentation"?", *IEEE IPCC '95 Proceedings*, (1995), 62-66.
Bederson, B., et al., "Pad++: A Zooming Graphical Interface for Exploring Alternate Interface Physics", *Seventh Annual Symposium on User Interface Software and Technology (UIST '94)*, (Nov. 2-4, 1994), 17-26.
Bederson, B. B., "Fisheye Menus", University of Maryland, (1999), 1-12.
Benel, R., et al., "Optimal Size and Spacing of Touch Screen Input Areas", *Human Computer Interaction—Interact '87*, (1987), 581-585.
Beringer, D., "Operator Behavioral Biases Using High-Resolution Touch Input Devices", *Proceedings of the Human Factors Society 33rd Annual Meeting*, (1989), 320-322.
Beringer, D., "Target Size, Location, Sampling Point and Instructional Set: More Effects on Touch Panel Operation", *Proceeding of the Human Factors Society 34th Annual Meeting*, (1990), 375-379.
Bernabei, A., et al., "Graphical I/O Devices for Medical Users", *14th Annual International Conference of the IEEE Engineering in Medicine and Biology Society*, (1992), 834-836.
Bier, E. A., et al., "Toolglass and Magic Lenses: The See-Through Interface", *Computer Graphics Proceedings, Annual Conference Series*, (Aug. 1993), 73-80.
Brown, M., "Browsing Graphs Using a Fisheye View", *Proceedings of the Interact '93 and CHI '93 Conference on Human Factors in Computing Systems (CHI '93)*, (1993), p. 516.
Burger, D., "Improved Access to Computers for the Visually Handicapped: New Prospects and Principles", *IEEE Transactions on Rehabilitation Engineering*, vol. 2, No. 3, (Sep. 1994), 111-118.
Carpendale, M. S. T., et al., "Distortion Viewing Techniques for 3-Dimensional Data", *Proceedings of the 1996 IEEE Symposium on Information Visualization (Infovis '96)*, (1996), 46-53.
Carpendale, M. S. T., "3-Dimensional Pliable Surfaces: for the Effective Presentation of Visual Information", *Proceedings of the 8th Annual ACM Symposium on User Interface and Software Technology (UIST '95)*, (1995), 11 pgs.
Carpendale, M. S. T., et al., "Making Distortions Comprehensible", *Proceedings, IEEE Symposium on Visual Languages*, (1997), 36-45.
Carpendale, M. S. T., et al., "Extending Distortion Viewing from 2D to 3D", *IEEE Computer Graphics and Applications*, (1997), 42-51.
Eslambolchilar, P. et al., "Making Sense of Fisheye Views", Hamilton Institute., 24 pgs.
Furnas. G., et al., "Effective View Navigation", *Proceedings of the ACM SIGCHI Conference on Human Factors in Computer Systems (CHI '97)*, (1997), 367-374.
Furnas, G. W., "Generalized Fisheye Views", *Conference Proceedings, Human Factors in Computing Systems (CHI '86)*, (1986), 1-8.
Furnas, G. W, "Generalized fisheye views", *Proceedings of the SIGCHI Conference on Human Factors in Computing Systems (CHI '86)*, (1986), 16-23.
Furnas, G., et al., "Space-Scale Diagrams: Understanding Multiscale Interfaces", *Proceedings of the SIGCHI Conference on Human Factors in Computing Systems (CHI '95)*, (1995), 234-241.
Furnas, G., "The Fisheye Calendar System", Bellcore Technical Memorandum, (1991), 1-9.
Furnas, George W, "The Fisheye Calendar System", Internet Citation, [Online]. Retrieved from the Internet: http://www.si.umich.edu/~furnas/Papers/FisheyeCalendarTM.pdf>, (1991), 1-9.
Greenberg, S., "A Fisheye Text Editor for Relaxed-Wysiwis Groupware", *Short Papers: CHI 96, CHI '96 Companion*, Vancouver, BC Canada, (1996), 212-213.
Greenberg, S., et al., "Awareness through Fisheyes Views in Relaxed-WYSIWIS Groupware", *Proceeding of Graphics Interface '96, Canadian Inf. Process Soc.*, Toronto, Ont., Canada, (May 22-24, 1996), 28-38.
Greenberg, S., "Fisheye Text Editor for Relaxed-WYSIWIS Groupware", *Proceedings of the 1996 Conference on Human Factors in Computing Systems, CHI 96*, (Abstract Only), (Apr. 13-18, 1996), 212-213.

(56) References Cited

OTHER PUBLICATIONS

Hinckley, K., et al., "A Survey of Design Issues in Spatial Input", *Proceedings of the 7th Annual ACM Symposium on User Interface Software and Technology (UIST '94)*, (Nov. 2-4, 1994), 213-222.

Kamba, T., et al., "Using Small Screen Space More Efficiently", *Proceedings of the SIGCHI Conference on Human Factors in Computer Systems (CHI '96)*, (1996), 383-390.

Keahey, T., et al., "Non-Linear Image Magnification", *Technical Report TR460*, (1996), 1-11.

Keahey, T., et al., "Nonlinear Magnification Fields", *Proceedings of the 1997 IEEE Symposium on Information Visualization (InfoVis '97)*, (1997), 1-12.

Keahey, T. A., et al., "Techniques for Non-Linear Magnification Transformations", *Proceedings of the 1996 IEEE Symposium on Information Visualization (InfoVis '96)*, (1996), 38-45.

Keahey, T., et al., "Viewing Text With Non-Linear Magnification: An Experimental Study", *Technical Report 459*, Department of Computer Science, Indiana University, (1996), 1-9.

Kline, R, et al., "UnWindows 1.0: X Windows Tools for Low Vision Users", *ACM SIGCAPH Computers and the Physically Handicapped*, vol. 49, (1994), 1-5.

Kline, R., et al., "Improving GUI Accessibility for People with Low Vision", *Proceedings of the SIGCHI Conference on Human Factors in Computing Systems—ACM*, (1995), 114-121.

Lamping, J., et al., "Laying out and Visualizing Large Trees Using a Hyperbolic Space", *Proceedings of the 7th Annual ACM Symposium on User Interface Software and Technology (UIST '94)*, (1994), 13-14.

Lazzaro, J, "Adapting desktop computers to meet the needs of disabled workers is easier than you might think", *Byte Magazine*, No. 144, (Jun. 1993), 5 pgs.

Leahy, M, et al., "Effect of Touch Screen Target Location on User Accuracy", *Proceedings of the Human Factors Society 34th Annual Meeting*, (1990), 370-374.

Leung, Y., et al., "A Review and Taxonomy of Distortion-Oriented Presentation Techniques", *ACM Transactions on Computer-Human Interaction*, vol. 1, No. 2, (Jun. 1994), 126-160.

Lieberman, H., "A Multi-Scale, Multi-Layer, Translucent Virtual Space", *Proceedings, 1997, IEEE Conference on Information Visualization*, (1997), 124-131.

Lieberman, H., "Powers of Ten Thousand: Navigating in Large Information Spaces", *Proceedings of the 7th Annual ACM Symposium on User Interface Software Technology (UIST '94)*, (1994), 15-16.

MacKinlay, J., et al., "The Perspective Wall: Detail and Context Smoothly Integrated", *Proceedings of the SIGCHI Conference on Human Factors in Computing Science (CHI '91)*, (1991), 173-176.

Milner, N., "A Review of Human Performance and Preferences with Different Input Devices to Computer Systems", *Proceedings of the Fourth Conference of the British Computer Society on People and Computers IV*, (1988), 341-362.

Noik, E., "Layout-independent Fisheye Views of Nested Graphs", *IEEE Symposium on Visual Languages (VL '93)*, (1993), 336-341.

Okazaki, T., et al., "Multi-Fisheye Distortion of the Network Map", *IEICE Transactions on Computers.* vol. E78-B. (Abstract Only), (1995), 61-67.

Okazaki, T., et al., "Multi-Fisheye Transformation Method for Large-Scale Network Maps", *NTT*, vol. 44, Issue 6, (Abstract Only), (1995), 495-500.

Okazaki, T., et al., "Multi-Fisheye Transformation Method for Large-Scale Network Maps", *NTT*, vol. 44, Issue 6, (1995), 25-30.

Pickering, J., "Touch-Sensitive Screens: The Technologies and Their Application", *Int. J. Man-Machine Studies*, vol. 25, (1986), 249-269.

Plaisant, C., et al., "Touchscreen Interfaces for Alphanumeric Data Entry", Human *Factors Perspectives on Human-Computer Interaction*, (1995), 261-265.

Potter, R., et al., "An Experimental Evaluation of Three Touch Screen Strategies within a Hypertext Database", *International Journal of Human-Computer Interaction*, vol. 1, No. 1, (1989), 41-52.

Potter, R., et al., "Improving the Accuracy of Touch Screens: An Experimental Evaluation of Three Strategies", *Proceedings of the SIGCHI Conference on Human Factors in Computing Systems (CHI '88)*, (1998), 27-32.

Rao, R., et al., "Exploring Large Tables with the Table Lens", *Proceeding Conference Companion on Human Factors in Computing Systems (CHI '95)*, (1995), 403-404.

Rao, R., et al., "The Table Lens: Merging Graphical and Symbolic Representations in an interactive Focus-Context Visualization for Tabular Information", *Proceedings of the ACM SIGCHI Conference on Human Factors in Computing Systems*, (Apr. 1994), 1-7.

Ren, X., et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, (1999), 19-37.

Ren, X., et al., "Improving Selection Performance on Pen-Based Systems: A Study of Pen-Based Interaction for Selection Tasks", *ACM Transactions on Computer-Human Interaction*, vol. 7, No. 3, (Sep. 2000), 384-416.

Ren, X., et al., "The Best among Six Strategies for Selecting a Minute Target and the Determination of the Minute Maximum Size of the Targets on a Pen-Based Computer", *Human-Computer Interaction: Interact'97*, (1997), 85-92.

Riecken, R., "Adaptive Direct Manipulation", *Proceedings, IEEE International Conference on Systems, Man, and Cybernetics*, (1991), 1115-1120.

Robertson, G., et al., "Information Visualization Using 3D Interactive Animation", *Communication of the ACM*, vol. 36, No. 4, (1993), 57-71.

Robertson, G., et al., "The Document Lens", *Proceedings of the 6th Annual ACM Symposium on User Interface Software and Technology (UIST '93)*, (1993), 101-108.

Rosner, P., et al., "In Touch: A Graphical User Interface Development Tool", Software Tools for Interface Design, *IEEE Colloquium*, (1990), 12/1-12/7.

Sarkar, M., et al., "Graphical Fisheye Views", *Communications of the ACM*, vol. 37, No. 12, (Dec. 1994), 73-84.

Sarkar, M., et al., "Graphical Fisheye Views of Graphs", Proceedings of the SIGCHI *Conference on Human Factors in Computing Systems (CHI '92)*, (1992), 83-91.

Sarkar, M., et al., *Graphical Fisheye Views of Graphs*, Issue. 84., © Digital Equipment Corporation 1992, (Mar. 17, 1992), 1-24.

Sarkar, M., et al., "Stretching the Rubber Sheet: A Metaphor for Viewing Large Layouts on Small Screens", *Proceedings of the 6th Annual ACM Symposium on User Interface Software and Technology (UIST '93)*, (1993), 81-91.

Schaffer, D., et al., "Navigating Hierarchically Clustered Networks through Fisheye and Full-Zoom Methods", *ACM Transactions on Computer-Human Interaction*, vol. 3, No. 2, (Jun. 1996), 162-188.

Scott, B., et al., "Designing Touch Screen Numeric Keypads: Effects of Finger Size, Key Size, and Key Spacing", *Proceeding of the Human Factors and Ergonomics Society 41st Annual Meeting*, (1997), 360-364.

Sears, A., et al., *Advances in Human-Computer Interaction*, vol. 3, Ablex Publishing Corp, (1992), 1-33, 105-183.

Sears, A., et al., "Chapter 1—A New Era for High Precision Touchscreens", In: *Advances in Human-Computer Int. 3*, (1992), 38 pgs.

Sears, A., et al., "High Precision Touchscreens: Design Strategies and Comparisons with a Mouse", *Int. J. Man-Machine Studies*, vol. 34, (1991), 593-613.

Sears, A., et al., "Investigating Touchscreen Typing: The Effect of Keyboard Size on Typing Speed", *Behaviour & Information Technology*, vol. 12, No. 1, (1993), 17-22.

Shneiderman, B., "Direct Manipulation for Comprehensible, Predictable and Controllable User Interfaces", *Proceedings of the 2nd International Conference on Intelligent User Interfaces*, (1997), 33-39.

Shneiderman, B., *Sparks of Innovation in Human-Computer Interaction*, Ablex Publishing Corporation, New Jersey, USA, (1993), 133 pgs.

(56) References Cited

OTHER PUBLICATIONS

Shneiderman, B., et al., "The Eyes Have It: A Task by Data Type Taxonomy for Information Visualization", *Proceeding of the 1996 IEEE Symposium on Visual Language (VL'96)*, 336-343.

Shneiderman, B., "Touch Screens Now Offer Compelling Uses", *Interface: Tools, Techniques, and Concepts to Optimize User Interfaces*, (Mar. 1991), 93-94.

Shneiderman, B., *Designing the User Interface*, Addison Wesley Longman Inc., Third Edition, (1998), 462-465,534-539.

Simkovitz, D., "LP-DOS Magnifies the PC Screen", *Proceedings of the John Hopkins National Search for Computing Applications to Assist Persons with Disabilities*, (1992), 203-204.

Simpson, A., *Windows 95 Uncut*, IDG Books Worldwide, Inc., Foster City, CA., (1995), 386-402.

Smith, R., et al., "Relating Distortion to Performance in Distortion Oriented Displays", *Proceedings, Sixth Australian Conference on Computer-Human Interaction*, (1996), 6-11.

Smith, Ray, et al., "Relating Distortion to Performance in Distortion Oriented Displays", Gippsland School of Computing an Information Technology, Monash University, (1996), 6-11.

Steinberg, S, "The New Yorker", [online]. Retrieved from the Internet: <http://www.thenewyorkerstore.com/product_details. asp?mscssid=0SMEJUPRK45U9L4NVXPRXUUK84490B66 &sitetype=1&did=5&sid=50326&pid=&keyword=steinberg &section=covers&title=undefined&whichpage=1 &sortBy=popular>, (Mar. 29, 1976), 1 pg.

Stone, M., "The Movable Filter as a User Interface Tool", *Human Factors in Computing Systems: CHI '94*, CHI 94—Apr. 1994, (1994), 306-312.

Su, J., et al., "A Review of Supernova Screen Magnification Program of Windows", *Journal of Visual Impairment & Blindness*, (Feb. 1999), 108-110.

Su, J., "A Review of Telesensory's Vista PCI Screen Magnification System", *Journal of Visual Impairment & Blindness*, vol. 92, No. 10, (Oct. 1998), 706-710.

Su, J., et al., "A Review of ZoomText Xtra Screen Magnification Program for Windows 95", *Journal of Visual Impairment & Blindness*, (Feb. 1998), 116-119.

Uslan, M., et al., "A Review of Henter-Joyce's MAGic for Windows NT", *Journal of Visual Impairment & Blindness*, (Dec. 1999), 666-668.

Uslan, M., et al., "A Review of Two Screen Magnification Programs for Windows 95: Magnum 95 and LP-Windows", *Journal of Visual Impairment & Blindness*, (Oct. 1997) 9-13.

Vogel, D., et al., "Shift: A Technique for Operation Pen-Based Interfaces Using Touch", *CHI 2007 Proceedings—Mobile Interaction Techniques I*, (2007), 657-666.

Ware, C., et al., "The DragMag Image Magnifier", *Proceeding Conference Companion on Human Factors in Computing Systems (CHI '95)*, (1995), 407-408.

"U.S. Appl. No. 13/252,227, Notice of Allowance mailed Sep. 25, 2013", 9 pgs.

"U.S. Appl. No. 13/252,232, Corrected Notice of Allowance mailed Oct. 9, 2013", 5 pgs.

"U.S. Appl. No. 13/252,232, Notice of Allowance, mailed Sep. 25, 2013", 9 pgs.

"U.S. Appl. No. 13/252,227, Non Final Office Action mailed Apr. 18, 2013", 5 pgs.

"U.S. Appl. No. 13/252,227, Response filed Jul. 18, 2013 to Non-Final Office Action mailed Apr. 18, 2013", 8 pgs.

"U.S. Appl. No. 13/252,232, Non Final Office Action mailed Apr. 25, 2013", 6 pgs.

"U.S. Appl. No. 13/252,232, Response filed Jul. 24, 2013 to Non-Final Office Action mailed Apr. 25, 2013", 9 pgs.

"European Application Serial No. 00986247.5, Office Action mailed May 29, 2008", 10 pgs.

"European Application Serial No. 00986247.5, Response filed Dec. 3, 2008 to Office Action mailed May 29, 2008", 11 pgs.

Goddard, Doug, "The latest rev: SQLWindows 4.1", Data Based Advisor, vol. 12, No. 5, (May 1994), 2 pgs.

"U.S. Appl. No. 13/252,227, Notice of Allowability mailed Nov. 12, 2013", 2 pgs.

"U.S. Appl. No. 13/252,232, Corrected Notice of Allowance mailed Nov. 4, 2013", 2 pgs.

\* cited by examiner

METHOD AND SYSTEM FOR PROVIDING AN EMBEDDED APPLICATION TOOL BAR

CROSS REFERENCE TO RELATED APPLICATIONS

This application is a divisional of U.S. application Ser. No. 09/477,739, filed Jan. 5, 2000, now U.S. Pat. No. 6,686,938, which is incorporated herein in its entirety and which is related to U.S. application Ser. No. 09/467,074, filed Dec. 20, 1999 now U.S. Pat. No. 7,434,177.

COPYRIGHT NOTICE AND WAIVER

®1999 Apple Computer, Inc.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

The present invention relates generally to graphical user interfaces for computer systems. More particularly, the present invention relates to a method and apparatus for providing menu tools generally associated with application user interfaces from an operating system.

The evolution of the computer industry is unparalleled in its rate of growth and complexity. Personal computers, for example, which began as little more than feeble calculators with limited memory, tape-driven input and monochrome displays are now able to tackle almost any data processing task with highly integrated high speed processors, gigabyte storage, high resolution video displays, and the now ubiquitous "mouse" input technology, which revolutionized the industry with the concept of "point-and-click". While this meteoric increase in processing speed and power, storage capacity, and input and output technology was almost sufficient to satisfy the demand of application designers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

The success of the GUI type human interface is evident from the sheer number of companies which have either emulated the virtual desktop environment or developed applications designed to operate in one. Even successful concepts, however, must continually be improved in order to keep pace with the rapid growth in this industry. For example, with the advent of multimedia, driven by technical advances in networking such as the Internet, and high capacity/fast access data storage devices such as CD-ROM devices, capable of providing streaming audio and video, application designers and users alike, demand additional functionality and greater ease of use from the desktop environment.

To appreciate the challenges associated with continuing GUI design, consider an early and continuing example of a GUI which has evolved over time: the Finder™ user interface and information management system (simply "Finder™ user interface" hereafter) associated with the Apple Macintosh™ computer. The Finder™ user interface is based on display principles using "windows" and "icons" to help manage computer information, launch applications, perform system management functions, and the like. The main or root window is called the "desktop" area, or more generally the primary display region. The desktop, or primary display region, is always open (displayed on the screen with its contents accessible or at least partially accessible), and takes up substantially the full display screen area when other windows are not open. The desktop is usually visible in the background when "icons" are displayed thereupon and other windows are open to other than their full size.

Icons are graphical objects which represent and serve to identify information, system resources, applications, and the like, and may exist inside any particular window, including the desktop itself. An icon may be associated with a particular collection of computer information, typically representing a "file" which may be a collection of data, a particular device or device handle, an application, program, and the like. An icon also may represent a window corresponding to, for example, an application in an active but "minimized" state. As described, icons are graphic images which may be displayed on the computer screen and usually correspond in appearance to the type of information, system resource, or application which the icon provides access to when the icon is visible. The use of icons and windows is well known in the art.

A "file" generally refers to a collection of information which the user wishes to use, create or modify; each particular file has an associated unique name for identification by both the system and the user. Therefore, any given file may be located within the information management system by knowing a file name, an iconographic representation associated with the name, or a window name associated, for example, with a group of files which are stored together. All information (files) grouped within a particular window may be identified with that particular window's own identification location within the computer information management system. Therefore, any particular file information can be retrieved knowing its particular identification name and its window name. Accordingly, a Finder™ user interface screen display, for example, may be broken down into multiple windows and graphic icons.

Another important element of conventional user interfaces is a screen cursor. The cursor allows direct user control over the user interface and generally represents the point on the desktop which is presently "active", e.g. where input may be received, or output may be seen or taken. The Finder™ user interface may be complemented with a "mouse" and a corresponding "pointer" which makes up the cursor control device and provides the "point-and-click" user interface. The pointer may be used to change where on the desktop the active cursor is at a given time. A mouse is an electromechanical device that translates two-dimensional mouse movement controlled by a user into a two-dimensional screen position movement represented by, for example, a pointer or arrowhead. The user may contact and direct the mouse while observing the position of the pointer on the screen thus bringing the user and the computer closer together via the interaction between the user, the mouse, the pointer and the display. When the mouse is moved signals are generated and input to the computer on an input port and the pointer moves correspondingly to a point on the display. Visual feedback may be used to control the exact location of the pointer by movement of the mouse. In addition, the computer may store the location of the pointer which corresponds to an exact location on the display. It should be noted that the computer may also store the location of each icon or other interactive object such that when the pointer and an icon location coincide, specific actions may be taken by the user to "activate" the icon as described in greater detail herein below.

The mouse may also be provided with one or more push buttons which may be used to effectuate control over the pointer by selecting or deselecting specific icons or other interactive tools. The mouse may be considered to be "activated" when the mouse button is depressed and the pointer remains active until the button is released. Pointer activation may also be initiated by sequences of mouse button presses, such as a "double click" interaction which involves rapidly pressing the mouse button press twice in sequence. By placing the pointer in a new location on the desktop and "clicking" or "double clicking", the location of the active cursor, for example, may be changed to a new window, or, for example, an application may be launched by "double clicking" on the application's icon. However, as the desktop-becomes increasingly crowded with icons, open windows and other selection options problems may arise.

Not surprisingly, GUI problems have received a significant amount of attention in recent years. Several GUI products have been developed which provide different solutions to the manner in which frequently used and currently active desktop objects are handled by the GUI. For example, consider the conventional GUI depicted in FIGS. 1(a) and 1(b). Therein, a "Desk Drawer" concept is implemented to provide selectively hideable access to frequently used desktop objects. FIG. 1(a) depicts the screen 75 having a desktop area 20 with the Desk Drawer closed, wherein only the handle 10 of the Desk Drawer is visible. An open window 60 containing several document icons 55-58 which are, therefore, accessible for operations by the user via cursor 50. The window 60 also includes a window title field 65 and window select region 74.

When activated, e.g., by placing cursor 50 over handle 10, the Desk Drawer "opens" to reveal its contents. In this case, icons 41, 42, 51 and 59 become visible. Now that these icons are visible, they too are available for manipulation by the user via cursor 50. Thus, the Desk Drawer concept provides a mechanism for placing frequently used icons in an out of the way, yet easily accessible location. The interested reader is directed to U.S. Pat. No. 5,657,049, entitled "Desk Drawer User Interface" for a more in depth discussion of this technique, the disclosure of which is incorporated here by reference.

Another conventional GUI, i.e., that provided with the WINDOWS 95 Operating System, tackles the problem of desktop clutter by the provision of a taskbar to organize concurrently running applications as shown in FIG. 2. Therein, the desktop window 200 includes a plurality of icons 210 as well as the taskbar 220. The icons 210 provide "shortcuts" to applications or documents which can be invoked, e.g., by "double-clicking" on the desired icon. The taskbar 220 identifies windows which are active including both those which are maximized and "minimized", i.e., are not currently displayed on the desktop 200. Each such active application is represented on the taskbar 220 by a corresponding button, which typically has an iconic representation of the application as well as some descriptive text. As new applications are launched, representative buttons will be added to the taskbar 220, from left to right. Each existing button will be scaled in length to permit the taskbar to accommodate new buttons. To "maximize" an application residing on the taskbar 220, the user can single click on the representative button. Another feature sometimes seen in this type of conventional GUI are application bars, e.g., appbar 230. Appbar 230 typically includes a number of smaller buttons (relative to the length of buttons on the taskbar when only a few applications are resident there), which buttons can be depressed to launch a currently inactive application.

This conventional GUI, however, suffers from the drawbacks of having a rather rigidly structured layout (e.g., the user cannot select or organize the order of the buttons on the taskbar 220) and from difficulties in handling the representation of a large number of applications. As more buttons are added to the taskbar 220, each individual button becomes smaller. When, for example, between 20-30 applications have been launched and minimized, the taskbar 220 begins to add new buttons as a second layer rather than continuing the line of buttons illustrated in FIG. 2. To reach the second layer, the user must toggle the taskbar 220, i.e., not all of the buttons are visible simultaneously on the GUI. As the power of computers and number of interesting applications, documents and other objects increases, it is anticipated that users will wish to have ready access to a growing number of objects and, therefore, will find the approach depicted in FIG. 2 to be cumbersome.

Another conventional GUI which attempts to solve this particular problem can be found in the NeXT™ Operating System. As illustrated in FIG. 3, and further described in U.S. Pat. No. 5,146,556, entitled "System and Method for Managing Graphic Images" (the disclosure of which is also expressly incorporated here by reference), this GUI provides an application "dock" 300 including a column of icons on the right side of the screen 310. The dock 300 is described as providing a visible mechanism for starting applications.

Although somewhat more flexible in terms of allowing the user to organize its content than the taskbar/appbar of FIG. 2, the application dock 300 still suffers from its limitations in terms of the number of applications which can be docked at any one time. For example, since the icons in the dock may generally be of a fixed size, there may be a limit to the number of icons which can be included in the dock at any one time. It will be appreciated however, that such limitations may be overcome and more icons may be displayed as constraints change or diminish.

Similar problems may arise upon launching applications, a document editor for example, where the use of the GUI is transformed into a more intensive series of menu selections, text insertion, graphical object insertion, and the like. Use of the GUI may become more repetitive with some menu items being used relatively infrequently but nevertheless being displayed and being present as a selection option in the menu even though rarely used. Accordingly, during certain operations within an application, menu use may become tiresome with infrequently used menu items being in the way of the task at hand. Like the appbar, taskbar, and application dock, as described herein above, application toolbars are a familiar feature in many applications and other Graphical User Interfaces (GUI).

Toolbars offer easier and more direct access to key commands of an application by presenting these commands as buttons either as part of the application's primary task window as is illustrated in FIG. 4A or in a floating window as illustrated in FIG. 4B. Toolbars are typically programmed by an application developer as part of an application program since the function associated with the toolbar selection is often closely tied to one or more functions performed by the application. Problems arise, however, in that if a configuration change is needed in the application requiring, for example, that new functions must be added to the application toolbar, a separate and complex human interface dedicated to the task of adding the new function is required. Often times, rebuilding of the application (e.g. compiling, linking, and the like) is needed to change the configuration of the toolbar. Moreover, as other, similar applications are used, a separate toolbar must be configured for each application and deliberately saved to preserve the new toolbar settings for the particular application.

Thus, it can be seen that while the above mentioned GUIs address certain issues and problems, there remains a need to provide the user with a larger degree of flexibility in terms of both the layout of the application toolbar which manages frequently used application menu objects, as well as permitting a larger number of such objects to be managed and simultaneously displayed and used across several applications which contain similar menu objects. It would therefore be appreciated in the art for a method and apparatus for increasing the capability and flexibility of application toolbars.

SUMMARY

It is therefore an object of the present invention to provide a method and system including an article of manufacture for providing menu tools in a user interface from an operating system.

Thus in accordance with one embodiment, a computer system having a user interface including a display, a cursor, and a cursor control device, such as, for example, a mouse or the like, and including an operating system, one or more menu tools are provided directly from an operating system to one or more applications having one or more application windows, such as, for example, a document editor or the like. A menu item associated with a menu tool representing, for example, an available operating system function, may be represented as an interactive icon in a region, such as a toolbar region, in one of the application windows. The region may be associated with a special operating mode, e.g., a mode associated with providing menu tools in accordance with the present invention. An operating system function, such as, for example, a print function, associated with the menu item may be made available to the application window directly from the operating system by interaction with the interactive icon.

In accordance with another embodiment of the present invention, one or more menu items may be displayed in an operating environment associated with the operating system such as a desktop or the like. When use of menu tools is desired, a special operating mode may be activated which allows one of the menu items to be selected. To make the function associated with the menu item available to the application, the selected menu item may be moved to the toolbar region of application windows associated with the special operating mode. The menu item may further be represented as an interactive icon within the region and preferably anywhere within the operating environment once the special operating mode is activated. It should be noted that the operating system function associated with the selected menu item may be made available to the application window directly from the operating system by interaction with the interactive icon. Additionally, in configuring the toolbar region for one application window, the menu item may be represented as an interactive icon in the regions of additional application windows which may either be active or subsequently instantiated. In other words all application windows "inherit" new configurations of the toolbar region. Accordingly, the operating system function associated with the menu item and the interactive icon may be made available to the additional application windows.

In accordance with yet another embodiment of the present invention, the special operating mode may be activated by activating an element of an input device associated with the special operating mode, such as, for example, a special key or the like. When such a mode is activated, one or more menu items may be displayed along with one or more menu tools corresponding to available operating system functions. Where menu items are present with no corresponding menu tools, the functions associated with the menu items are not supported by the operating system.

BRIEF DESCRIPTION OF THE DRAWINGS

The objects and advantages of the invention will be understood by reading the following detailed description in conjunction with the drawings, in which.

DETAILED DESCRIPTION

Figure 1A:
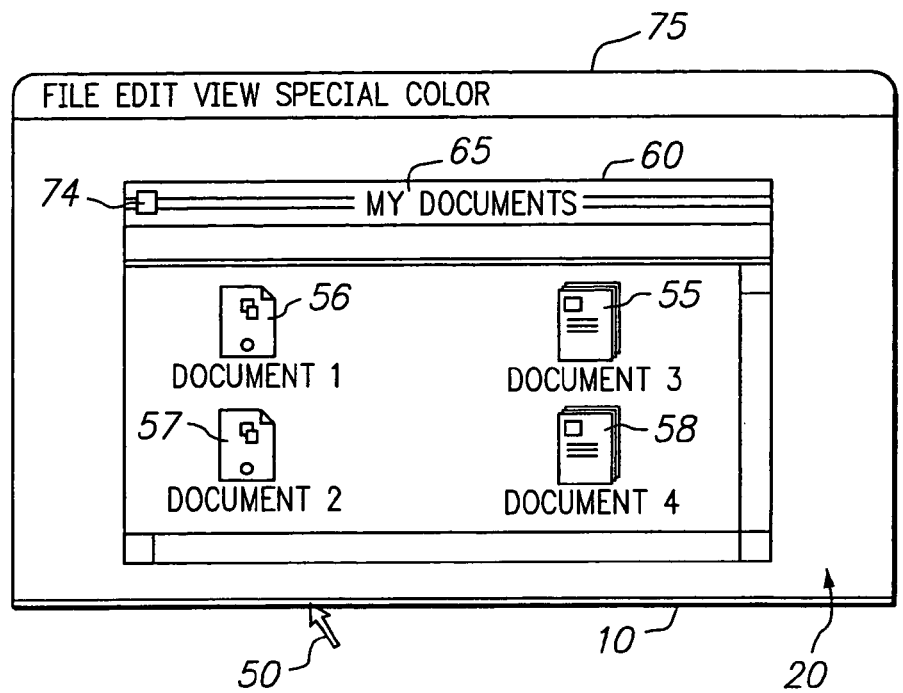
FIG. 1A is a diagram illustrating a conventional user interface.
Figure 1B:
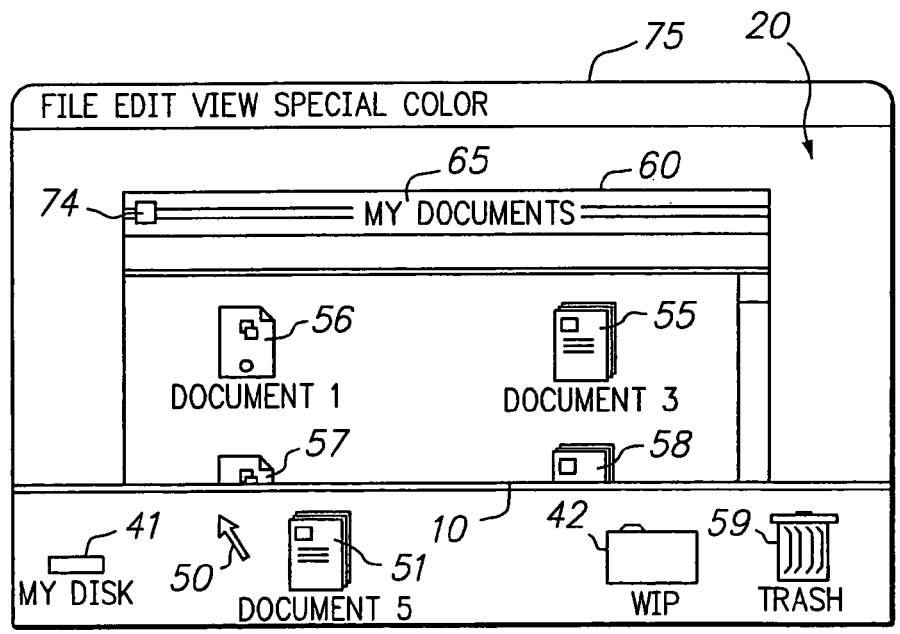
FIG. 1B is a diagram further illustrating the conventional user interface of FIG. 1A.
Figure 2:
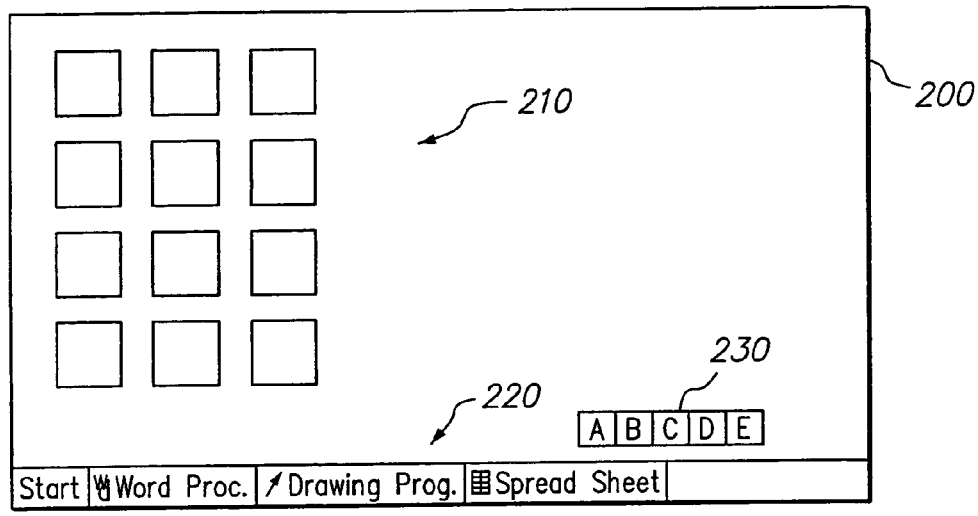
FIG. 2 is a diagram illustrating another conventional user interface employing a taskbar and an appbar.
Figure 3:
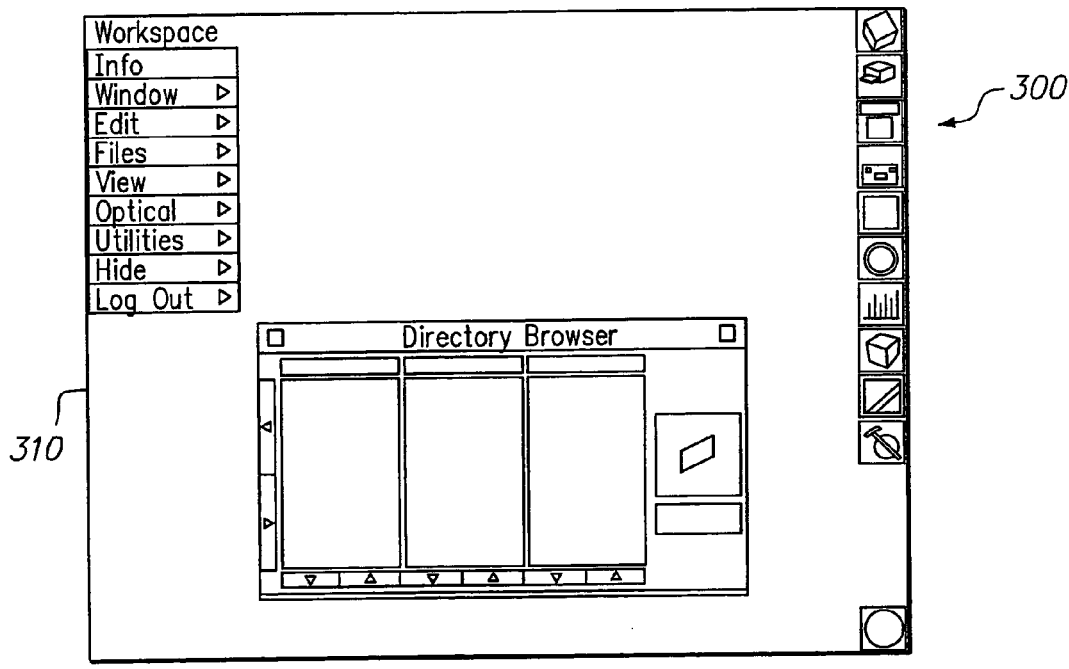
FIG. 3 is a diagram illustrating yet another conventional user interface employing an application dock.
Figure 4A:
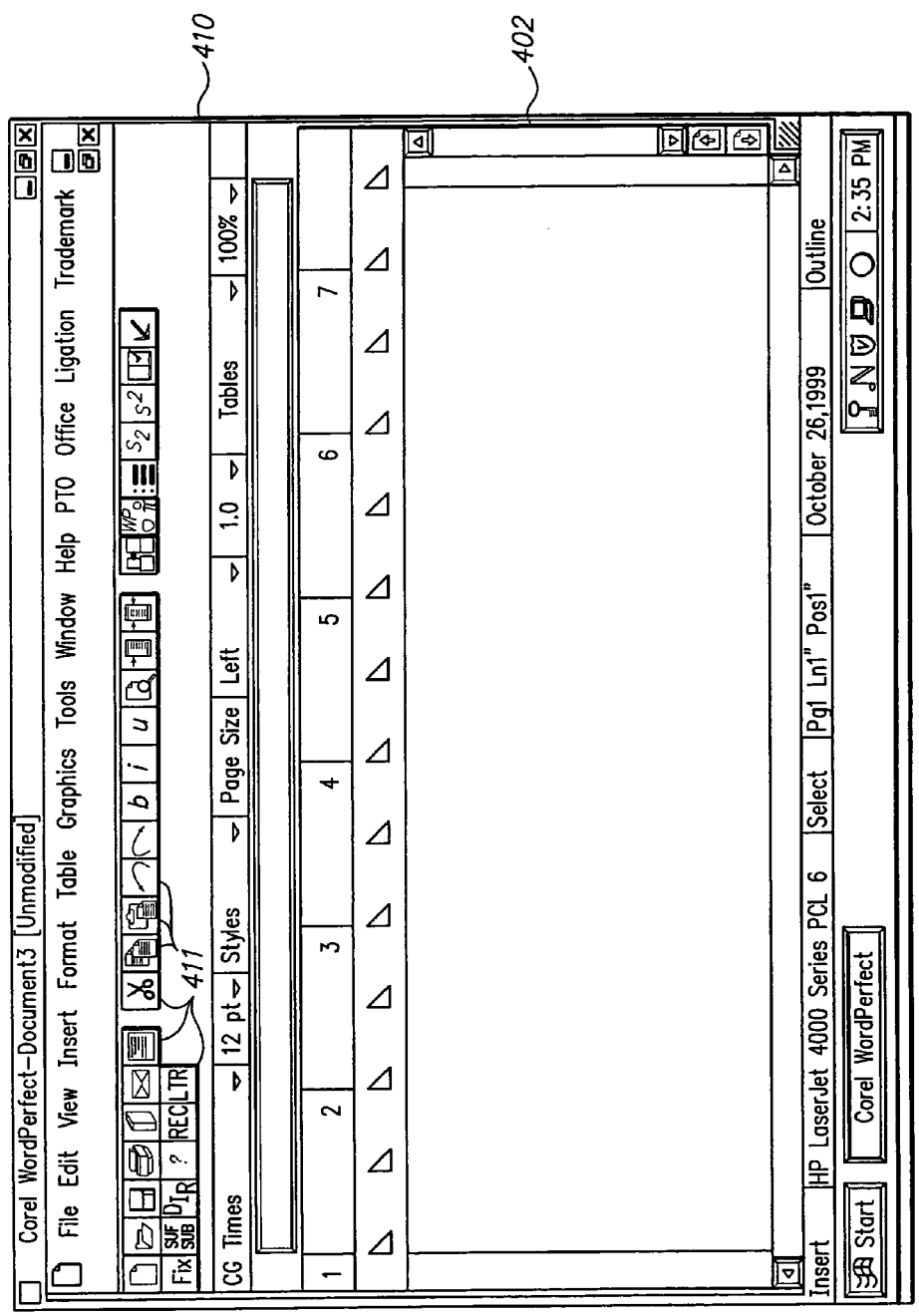
FIG. 4A is a diagram illustrating a conventional user interface employing an application tool bar.
Figure 4B:
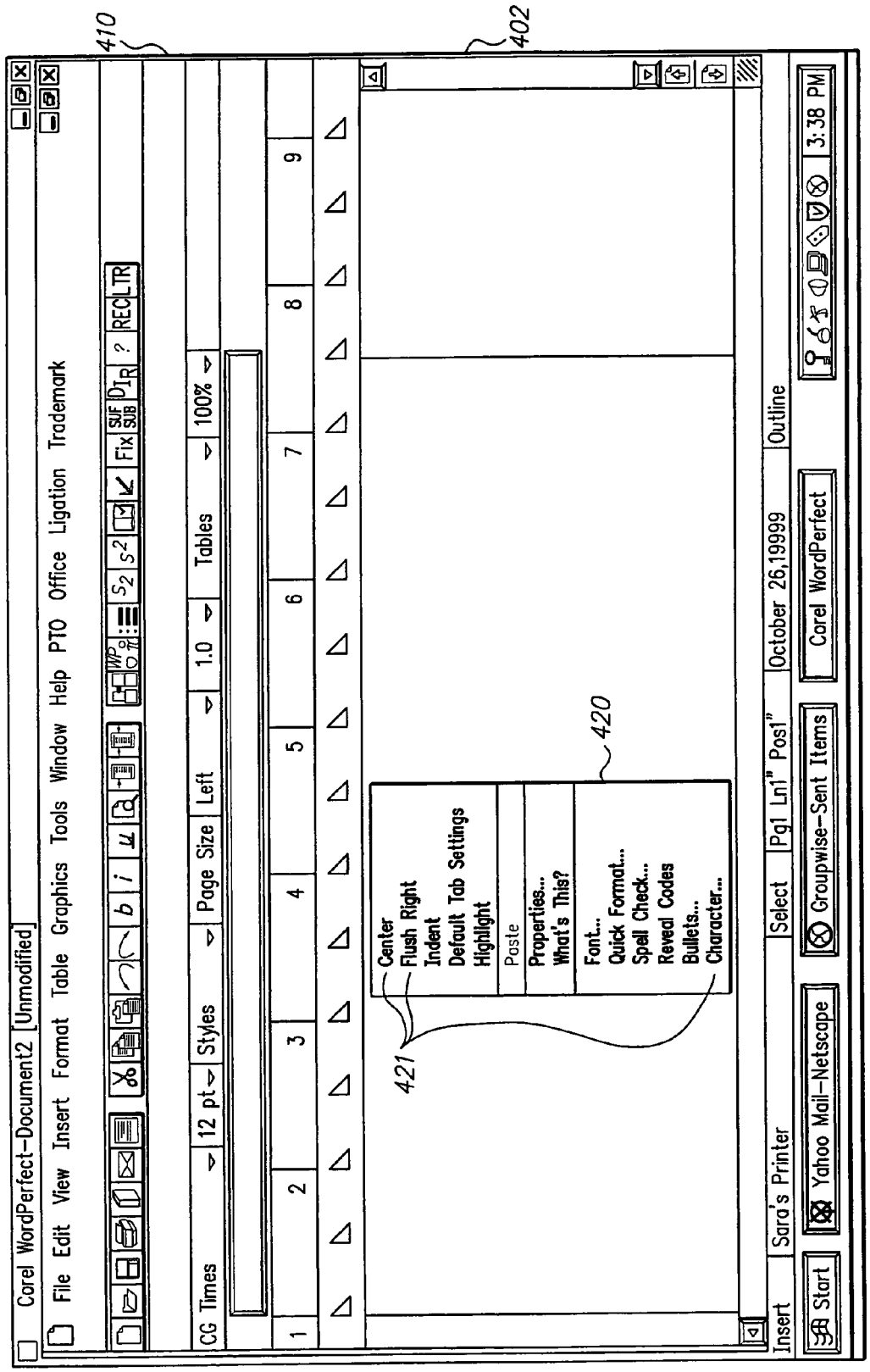
FIG. 4B is a diagram illustrating a conventional user interface employing a floating application tool bar.

The various features of the invention will now be described with reference to the figures, in which like parts are identified with the same reference characters.

Figure 5:
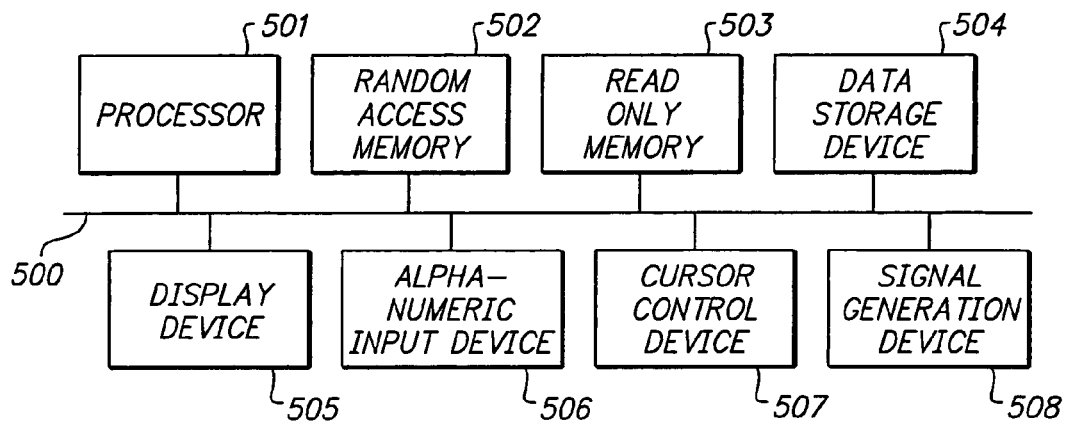
FIG. 5 is a block diagram illustrating exemplary functional blocks of an exemplary system in accordance with present invention.

Exemplary embodiments of the present invention may be implemented, for example, on a typical Apple™ computer system using, for example, the Mac OS operating system user interface. However, it will be readily appreciated by those skilled in the art that user interfaces and elements of user interfaces in accordance with the present invention may be used in combination with any system having typical system components such as, for example, a processor and a display. It should further be noted that the present invention may be embodied as an article of manufacture such as a software disk, optical disk, software download from a network, or the like including instructions for causing a processor to carry out steps in accordance therewith. In general, such computer systems, as illustrated in block diagram form in FIG. 5, may include, for example, bus 500 for communicating information, processor 501 coupled with bus 500 for processing information and instructions, random access memory 502 coupled with bus 500 for storing information and instructions for processor 501, read only memory 503 coupled with bus 500 for storing static information and instructions for processor 501, data storage device 504 which may be, for example, a magnetic disk and disk drive or CD ROM drive coupled with bus 500 also for storing information and instructions. Display device 505 may be coupled to bus 500 for displaying information and providing visual feedback to a computer user. It will be understood that display device 505 may include appropriate interfaces such as a graphics adapter or the like. Alphanumeric input device 506 may further be coupled to bus 500, and may include, for example a keyboard, including alphanumeric and function keys for communicating information and command selections to processor 501. Cursor control device 507 may be coupled to bus 500, and, through visual feedback on display device 505 from, for example, a pointer icon associated with a mouse, and may communicate information and command selections to processor 501. Signal generating device 508 may further be coupled to the bus 500 for providing signal related input/output functions to processor 501.

Display device 505 for suitable use in accordance with the present invention may preferably be, for example, a liquid crystal device, cathode ray tube, or other display device suitable for creating images and alphanumeric characters including ideographic character sets recognizable to the user. Cursor control device 507 may allow the computer user to control the two dimensional movement of a visible symbol such as a cursor and/or a pointer on a display screen of display device 505. Many implementations of cursor control device 507 are known in the art including a trackball, mouse, joystick or special keys on the alphanumeric input device 506, any of which may be capable of signaling movement of a given direction or manner of displacement of a corresponding visual indication such as a pointer icon, or visual representation of a cursor. It is to be appreciated that the cursor may be directed and/or activated via input from alphanumeric input device 506, such as a keyboard, using special keys and key sequence commands. Alternatively, a cursor may be directed and/or activated via input from a number of specially adapted cursor directing devices, including those uniquely developed for the disabled. For example, a cursor may be directed and corresponding adjustments in the position of a cursor and/or corresponding selections, activations, and the like as might be seen for example by operating a mouse button may be made through devices specifically adapted to recognize speech input. In the discussions regarding cursor movement and/or activation within the preferred embodiment, it is to be assumed that the input cursor directing device or push button may consist of any of those described above and specifically is not limited to a mouse cursor device.

Figure 6A:
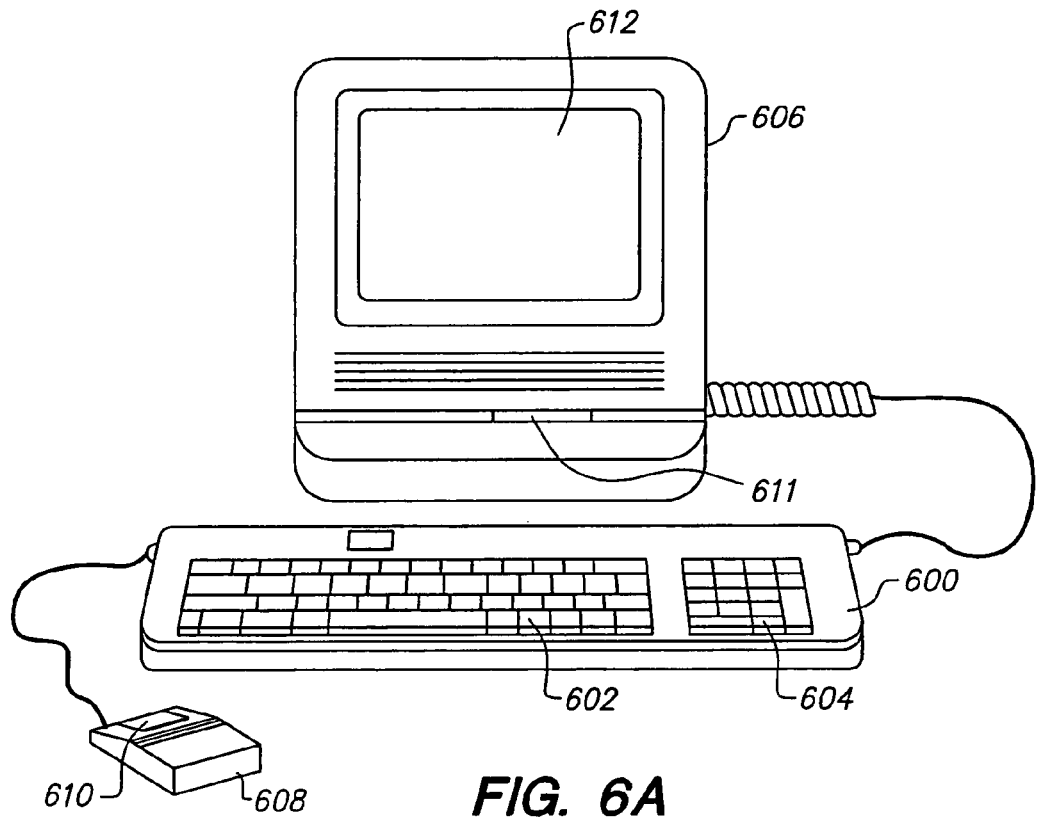
FIG. 6A is a diagram illustrating an exemplary computer system which may include the functional blocks of FIG. 5.

FIG. 6A illustrates an exemplary computer system in which the present invention may be implemented. It will be appreciated that such a computer system is of many computer systems that may used in accordance with the present invention. Accordingly, keyboard 600 having, for example, keys 602 and numeric keypad 604 may be attached to computer 606 along with a cursor control device such as, for example, mouse device 608 having one or more mouse push buttons 610 for providing and controlling certain relocation and activation features associated with the cursor and, for example, an icongraphic object which it may be "pointing" to. Mouse device 608 and push button 610, for example, may make up one example of a device in accordance with cursor control device 507. It will be appreciated that many other devices may be used as cursor control device 507, for instance, keyboard 600 may be substituted for mouse device 608 and buttons 610 as described. Computer 606 also typically contains one or more media drives 610 which may include, for example, a floppy disk, hard disk or CD ROM. Computer 606 importantly may include a display screen 612, which as described, may include, for example, a CRT, LCD display, and the like.

In accordance with the present invention, an operating system based menu toolbar allowing various MenuTool items to be added, moved, invoked, and removed, may be provided through, for example, an operating system extension or the like, which may be referred to hereinafter as "MenuTools". MenuTools provides a familiar toolbar-like feature across applications and window instances within an operating system user interface environment such as, for example Mac OS operating system and other operating systems which provide a user interface. As described herein above, application toolbars have been known in the art and been present in, for example, many Mac OS operating system based applications. An operating system specific integrated implementation having a common user interface however has not been available. Thus, MenuTools in accordance with the present invention is intended to provide a user-configurable operating system based solution for providing universally available functions for many applications. Once configured, MenuToolbars are available through inheritance to subsequently launched instances of applications and new applications. Similarly, when a configuration changes, the new configuration may take effect in all open application windows and in subsequently launched application windows.

Figure 7A:
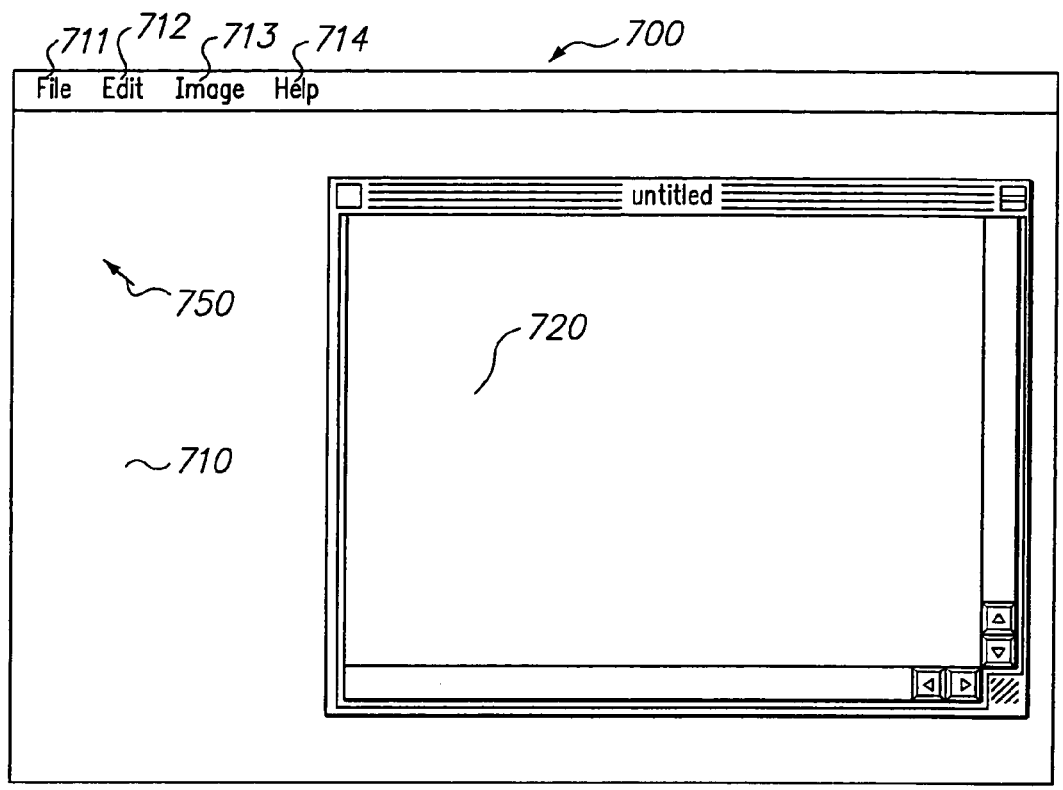
FIG. 7A is a diagram illustrating an exemplary operating environment and application window in accordance with the present invention.

An exemplary embodiment of user interface 700 in a relatively fundamental form in accordance with the present invention is illustrated in FIG. 7A, where an application employing, for example, document window 720 within operating environment 710 having pull down menu categories, such as, for example, File 711, Edit 712, Image 713, and Help 714 accessible using pointer 750, the position of which may be controlled, for example, by a cursor control device as previously described such as a mouse, trackball, or the like. Operating environment 710 may be driven by an operating system in accordance with the present invention and may include for example hardware interfaces to resources such as, for example, printers, input devices, output devices, and the like as would be appreciated by one skilled in the art of operating system design.

Figure 7B:
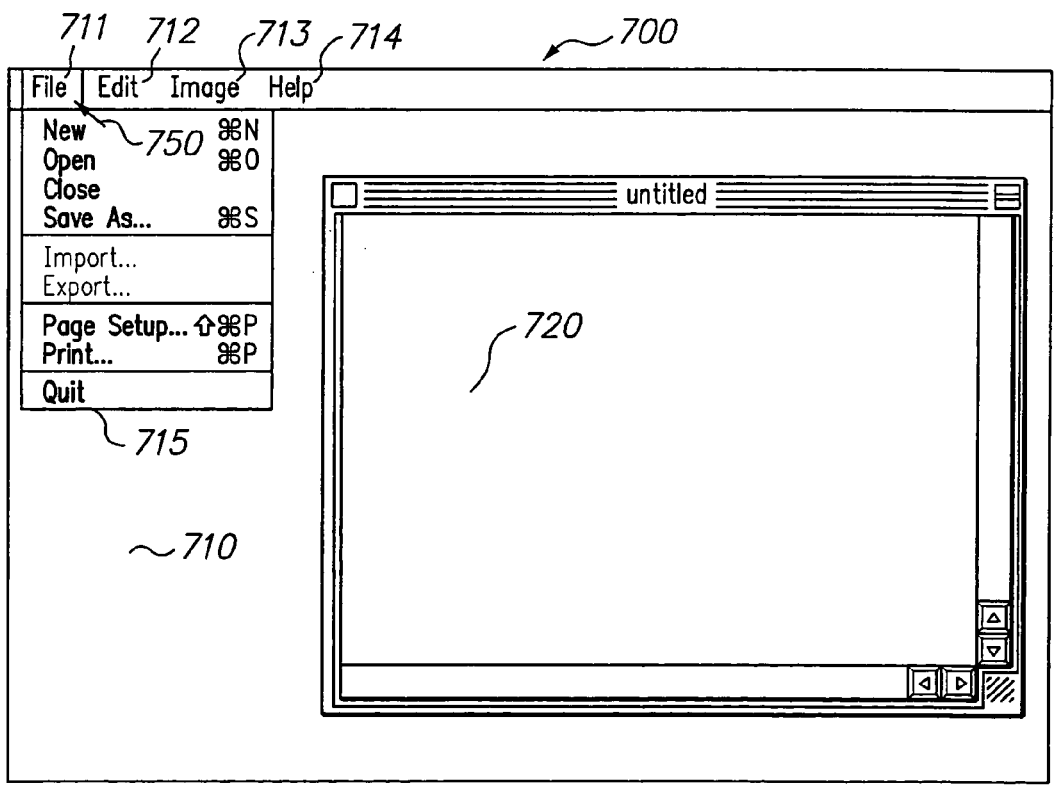
FIG. 7B is a diagram further illustrating the exemplary operating environment and application window of FIG. 7A.
Figure 8A:
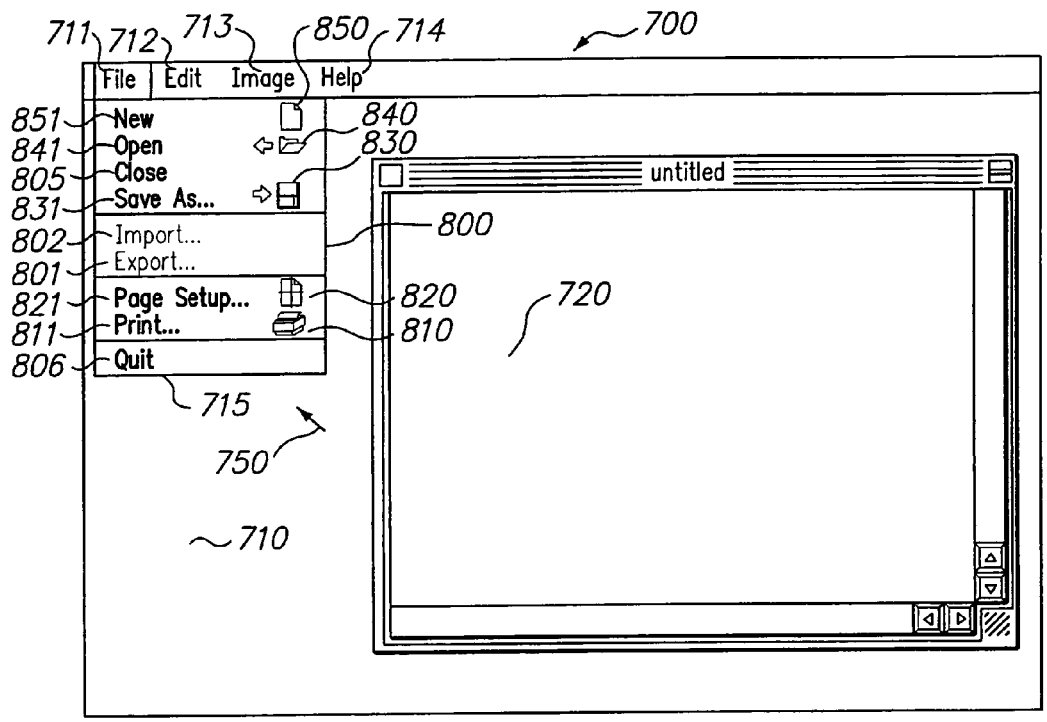
FIG. 8A is a diagram illustrating exemplary MenuTools in accordance with the present invention.

A more detailed view of the exemplary embodiment of FIG. 7A is illustrated in FIG. 7B. MenuTools offers a simpler and more direct system and method for access to, for example, menu items 715 within menu category File 711. It should be noted that MenuToolbars configured using MenuTools are particularly useful for menu items which are commonly used by a wide variety of applications such as, for example, Print, Save, Cut, Copy and Paste. In accordance with a further embodiment and to accommodate the needs of different users, MenuTools in accordance with the present invention can be easily configured by the user as is further illustrated in FIG. 8A, FIG. 8B, and FIG. 8C.

As previously described, MenuTools 800 in accordance with the present invention may be implemented at the operating system level. It will be appreciated by those skilled in the art that user interface 700 and operating environment 710 are direct representations of an underlying operating system which, for example, may be responsible for the display of operating environment 710, the launching and management of applications of which may have accompanying information displays such as, for example, document window 720. Accordingly, in the present embodiment, menu items 715, such as may be available in operating environment 710 by way of an underlying operating system (not shown), may be automatically inherited by applications with which, for example, document window 720 may be associated.

MenuTools 800, including, for example, Print tool 810 corresponding to Print menu item 811, Page Setup tool 820 corresponding to Page Setup menu item 821, Save As tool 830 corresponding to Save As menu item 831, Open tool 840 corresponding to Open menu item 841, and New tool 850 corresponding to New menu item 851, as may be recognized by those skilled in the art, and even more universally by those familiar with application use, may map directly to many common application menu items. Each of menu items 715 may be a candidate for MenuTools 800 although not all menu items 715 need necessarily be mapped to MenuTools 800 as can be seen, for example, with Import menu item 802 and Export menu item 801, which may be characteristically "greyed out", "ghosted out", or otherwise unavailable. It will be appreciated that in accordance with the present invention, MenuTools 800 allows applications to be fully user-configurable and may, alternatively, be pre-configurable by, for example, an application developer as part of a standard set of basic functions. It should be noted that the distinction between functions available as part of a "native" application interface rely on being individually programmed into the application, and, once programmed in, become part of a fixed set of functional alternatives for that application. If new functions are desired to keep abreast of the addition of functional capabilities to, for example, operating environment 710 of user interface 700, a new version of the application must be developed. In contrast, MenuTools 800 and associated functions "belong" to the operating system responsible for operating environment 710 of user interface 700 and may, in accordance with the present invention, be made available to an application. It should further be noted that separate individual sets of MenuTools 800 may be configurable per application and individual MenuTool preferences may be stored per-application and per-user as will be described in greater detail hereinafter. MenuTools 800 allow a user, or an application developer, to construct or modify an application's toolbar of frequently used actions which may provide direct access to related operating system action. Specific components which may make up MenuTools 800 include, an application menu tool such as Print tool 810 described hereinabove, selected, for example, from menu categories 711-714, including, for example, hierarchical sub-categories, such as menu items 715. Further in accordance with the present embodiment, document window 720 may be provided with new MenuToolbar region 860 as is illustrated, for example, in FIG. 8C.

To better understand operation in accordance with the present invention MenuTools 800 is now described in greater detail. As previously described, any and all menu items 715, particularly as embodied, for example as icons or "tools" such as Print menu too 810, may be candidates for MenuTools 800 including hierarchical sub-menu items. Menu item names, as they appear on the menu bar, such as Print menu item 811 are generally not eligible for MenuTools 800, although in alternative embodiments menu names may be used. It may be possible for a sub-menu's parent item or category, such as File category 711 to be made into a MenuTool 800. However, such a MenuTool would produce a pop-up menu on, for example, a mouse button down click associated with pointer 750 upon tool selection. It should be noted that the behavior of, for example, menu items 715 which are selected for inclusion are not affected by inclusion as MenuTools 800. When, for example, one of menu items 715 such as Print menu tool 810 is added to, for example, MenuTool bar 860, the underlying menu item's appearance and behavior remains unaffected. It should further be noted that a menu item does not require a keyboard shortcut to be a candidate for MenuTools 800.

When MenuTools 800 configuration modifier key, which may be a key on, for example, alphanumeric input device 506, is pressed (not shown), MenuTools 800 tool icon is presented in response, indicating that a special operating mode has been activated. In alternative embodiments, the special operating mode may be activated in software or through a software button on the user interface. Tool icons are preferably presented in the same position as the keyboard shortcut, replacing the keyboard shortcut as is illustrated for example going from FIG. 7B to FIG. 8A where Print menu item 811 is now associated with icongraphic Print tool 810. Accordingly, MenuTool icons may exist as either common system resources, or application-specific resources, therefore it would be desirable to deliver an operating system, with a large set of MenuTool icons which map to common application menu items. Examples include: New tool 850, Open tool 840, Save As tool 830, Page Setup tool 820, Print tool 810, as well as tools not shown such as Close tool, Save tool, Revert tool, Quit tool, Cut tool, Copy tool, Paste tool, Clear tool, and the like. It is contemplated that specific icons may be associated with menu items and may be provided for example as an operating system resource. However, if a menu item does not provide a corresponding MenuTool icon, a generic icon may be substituted. Consequently, a user may rely on, for example a help facility, e.g. "tooltips" to identify distinct Menu Tools on, for example, MenuToolbar 860.

MenuToolbar 860 generally applies only to document window 720. Modeless or Modal dialog boxes which resemble windows are generally not configured to support a menu toolbar, such as MenuToolbar 860, in a manner contemplated in accordance with the present invention. It may be possible that MenuToolbar 860 may be implemented in dialog boxes however in alternative embodiments. Utility windows further cannot support a menu toolbar.

It may be appreciated by those skilled in the art that several window and operating characteristics may be associated with MenuTools 800 during the course of operation of an application described as follows. Document window 720's Menu-Toolbar 860 region is an extension of window titlebar 721. MenuToolbar 860 region may preferably be located immediately below titfebar 721 and extend the full width thereof, although other configurations are possible such as along the side, along the bottom, and like alternative locations in document window 720. It may further be possible, in alternative embodiments for MenuToolbar 860 to be located in other regions. MenuToolbar 860 region is a sufficient height to accommodate the MenuTool icons such as, for example, Save As tool 861 icon, Paste tool 862 icon, Copy tool 863 icon, and Print tool 863 icon. MenuTools 800, when individually placed on MenuToolbar 860 region, as is illustrated in FIG.

Figure 8B:
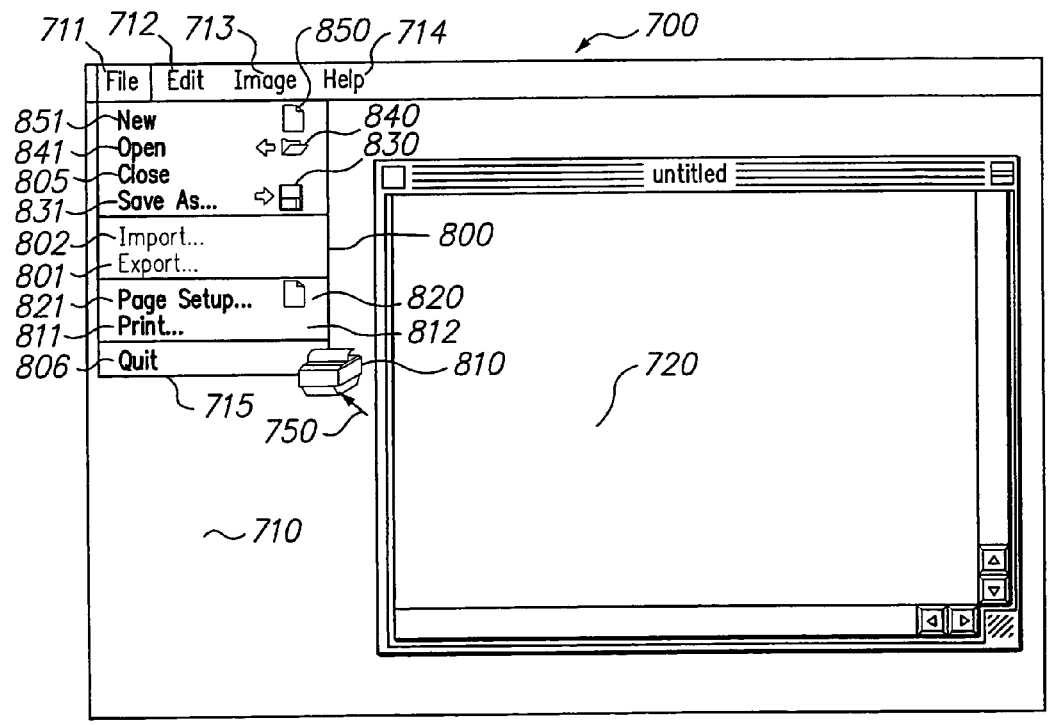
FIG. 8B is a diagram further illustrating exemplary MenuTools of FIG. 8A in accordance with the present invention.
Figure 8C:
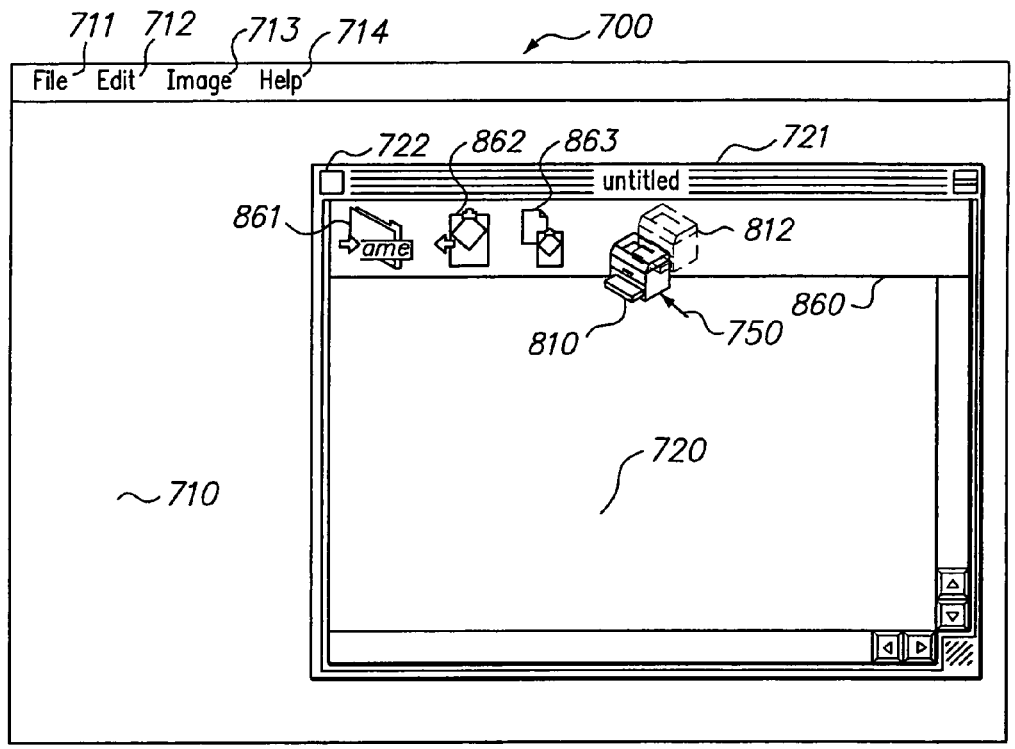
FIG. 8C is a diagram further illustrating exemplary MenuTools of FIG. 8B in accordance with the present invention.
Figure 8D:
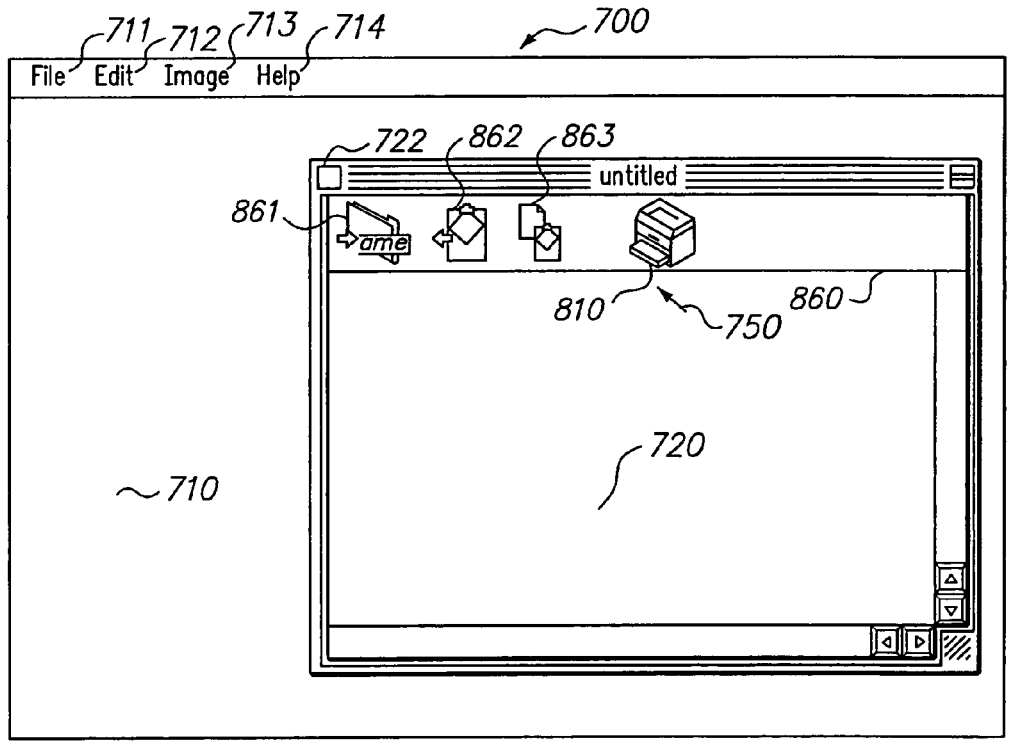
FIG. 8D is a diagram further illustrating exemplary MenuTools of FIG. 8C in accordance with the present invention.

8C, may be positioned on a known grid. As can be seen in FIG. 8B, Print tool 810 may first be "selected" by moving pointer 750 over Print tool 810 as it sits in MenuTools 800 area adjacent to Print menu item 811 and clicking a button, for example, mouse push button 610 on mouse device 608. At this point, as would be appreciated by those in the art, mouse push button 610 may be configured so that whether mouse push button 610 is held or not Print tool 810 will move with pointer 750. Consequently, Print tool 810 may be moved to position on MenuToolbar 860 on document window 720 as shown in FIG. 8C. In the present embodiment, a single row of Menu-Tool icons is preferably supported. It will be appreciated by those skilled in the art however that in accordance with alternative embodiments of the present invention, multiple rows of MenuTool icons may be supported.

MenuToolbar 860 region may further be shown or hidden by using, for example, MenuTool control 722 on titlebar 721. MenuTool control 722 may act as a toggle, alternately showing and hiding the MenuToolbar 860 region on subsequent mount clicks. In the present embodiment, there is no affordance, other than the presence of the MenuTool control 722 to indicate to a user, for example, that document window 720 supports a MenuToolbar 860. However it will be appreciated that other means of identification may be possible. For example a "greyed out" MenuTool control 722 may be provided to indicate that MenuToolbar 860 is not presently available. It may further be appreciated that MenuToolbar 860 can be revealed or hidden on a per-window basis and further certain operational activities may affect the display of Menu-Tool icons in MenuToolbar 860. For example, when document window 720 is resized, MenuToolbar 860 region may be clipped. MenuTool items, instead of being clipped, for example, may be removed if there is insufficient space to present the entire MenuTool button although it is possible that MenuTool items may be hidden or the like to indicate to a user, for example, that upon resizing document window 720, more MenuTool items may become available. A MenuTool item may refer to a MenuTools 800 tool item, such as Print tool 810, once it has been placed on document window 720's MenuToolbar 860 region. MenuTool items may consist of a menu item's MenuTool icon such as Print tool 810 which has a normal interaction of a user interface button element, found in virtually all conventional GUIs.

It should further be noted that perferably all of an application's open document windows will inherit the same Menu-Toolbar 860. Any changes to one window's MenuToolbar 860 will be reflected in all other open document window's Menu-Toolbar 860. In accordance with existing menu item behaviors, MenuTools 800 may support an "on" state as well as a radio button group behavior. However it will be appreciated by skilled developers that, for example, if a group of menu items is intended to act as a radio button group, all the menu items may be considered a single MenuTool, however, pressing the MenuTool icon or otherwise activating the MenuTool could produce, for example, a pop-up menu whereby only a single menu item could be selected. Alternatively, pressing the MenuTool could "rotate" through the menu items. This is particularly useful in, for example, the Finder™ for switching through views. It should be noted that pressing a MenuTool icon is the equivalent to selecting or activating the associated menu item. Any subsequent operating system action or response may still be applicable including, for example, bringing up a dialog box, saving a document or even quitting an application. MenuTools 800 may support pop-up menus. If, for example, a menu item which supports a sub-menu, is placed on MenuToolbar 860 as a MenuTool, selecting it should produce a pop-up menu of the hierarchical sub-menu's contents as previously described with reference to hierarchical submenu items. MenuTools 800 may further be supported by a help facility, or tooltips, the content of which may be as simple as the originating menu item name. For example, the tooltip for the Print tool 810 is "Print". If, for example, help tags are used, the tag may be the same as the originating menu item's tag.

It should be noted that an experience using MenuTools 800 is intended to conform as closely as possible to a user experience associated with the underlying operating system and operating environment as a whole to preserve a characteristic and consistent "look and feel". For example, a user experience associated with MenuTools 800 may preferably correspond to the user experience of the general operating environment according to various design principles which dictate for example, how drag and drop operations are performed. By ensuring such consistency, use of MenuTools 800 will be more likely to be intuitively obvious to users already familiar with the characteristics of the operating environment. Accordingly, MenuTools 800 may be configured through direct manipulation of tool items through the user interface as described in greater detail herein below and thus offer a more explicit interaction than menu keyboard shortcuts and can be tailored by each user, for each application.

Figure 6B:
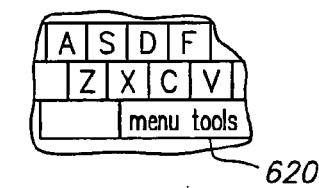
FIG. 6B is a diagram illustrating an detail of exemplary computer system of FIG. 6A.

As previously described, any application menu item can be made into a MenuTool. Menu items, such as, for example, Print tool 810 may be "torn off" from menu items 715 as described above with reference to FIG. 8C and placed onto document window 720's MenuToolbar 860 region, resulting in an icongraphic "button" corresponding to the originating menu item. An icon, as well as a tooltip, may be used to tie a MenuTool and the originating menu item together. The user interaction for creating a MenuTool, for example Print tool 810 from a menu item, for example, Print menu item 811 may be described in greater detail as follows. A user may first select a menu category such as File 711. In accordance with one embodiment, menu items 715 corresponding to File 711 menu category should preferably be presented as "sticky", that is, the menu remains open and menu item 715 displayed after a mouse button associated with pointer 750 is released. Stickiness, may be a standard behavior in many operating systems, such as, for example, Mac OS operating system. Once menu items 715 are presented, a user may press a designated or special key, such as MenuTool modifier key 620 as may be illustrated in FIG. 6B. In the absence of a dedicated key for MenuTools 800 activation such as MenuTool modifier key 620, the default modifier key for configuring MenuTool items may be the command key, as it does not interfere with keyboard shortcuts and already has an association with menu items.

With the MenuTool modifier key 620 pressed, a user may click and drag, for example, Print tool 810 to a desired application window such as document window 720. During a drag operation, a user enters MenuToolbar 860 region of active document window 720, ghosted icon 812 appears in the closest available "slot" on MenuToolbar 860 as is illustrated in FIG. 8C. The closet available slot may be defined as the first unoccupied position on MenuTool item grid from the left edge of MenuToolbar 860 and right of the mouse position. As will be appreciated by those skilled in the art, if a user then "drops" the MenuTool icon while a ghosted icon is visible, e.g. while pointer 750 is in the process of "dragging", for example, Print tool 810 within MenuToolbar 860, the Menu-Tool item is added to MenuToolbar 860. The originating menu, for example, menu items 715 associated with File category 711 may also be dismissed when a tool icon is "dropped" into MenuToolbar 860.

It should further be noted that multiple instances of MenuTool items preferably cannot be added to MenuToolbar 860. If an attempt is made at adding a redundant menu item to MenuToolbar 860, the previous instance may be removed. MenuTool items, once placed in MenuToolbar 860, may be repositioned to any available "slot" on MenuToolbar 860. MenuTool items preferably cannot be placed in between existing items. In accordance with the present embodiment, only one MenuTool item at a time may be moved, however, it will be appreciated that in alternative embodiments, several MenuTool items may, for example, be selected and moved as a group. A user may wish to reposition items after other items are deleted, or if the rightmost items are frequently clipped because of the window being resized. The interaction for repositioning a MenuTool item is as follows. A user may press the command key and position, for example, pointer 750 over the desired MenuTool item to be moved, such as, for example, Print tool 810. It may be preferable during repositioning operations for pointer 750 to change to the grab hand cursor (not shown). With modifier key 620 thus pressed, a user may click and drag a desired MenuTool item such as Print tool 810 to a new location. As Print tool 810 is dragged over eligible drop positions, a ghosted icon, such as ghosted icon 812 for example, appears in the position. A user may then drop the MenuTool item on an available position, resulting in the MenuTool item be added to the MenuToolbar 860. It may further be desireable for a "closest available slot" to apply in moving or repositioning menu items, as well as more complex repositioning features such as groupings, inserting between existing items, and the like as will be appreciated by those skilled in the art. MenuTool items, once placed in a MenuToolbar, preferably can be removed one MenuTool at a time or in an alternative embodiment may be selected and moved as a group. A user may wish to remove items to make room for new items, or to remove items that are frequently clipped due to the window being resized. To remove a MenuTool item, a user may press modifier key 620 or the command key and position the cursor over the desired MenuTool item to be moved preferably resulting in pointer 750 changing to the grab hand cursor as described. With modifier key 620 pressed, the user clicks and drags the desired MenuTool item anywhere outside of MenuToolbar 860 region. This includes into document window 720's content region, titlebar 721, or anywhere outside of document window 720's frame and in operating environment 710. While outside of MenuToolbar 860 region with, for example, Print tool 810, ghosted icon 812 will not appear anywhere on MenuToolbar 860. Dropping a MenuTool item at this point, e.g. releasing, for example, a mouse button, may result in the MenuTool item being removed from MenuToolbar 860. It should be noted that MenuTools are preferably not be dragged from one document window to another since all application windows inherit the same MenuToolbar 860. Further, removing a MenuTool item in the manner described herein above, e.g. dragging a MenuTool item outside of MenuToolbar 860, preferably results in automatic removal from all application windows.

It should be appreciated that a common interaction with MenuTool items once placed in MenuToolbar region 860 will be to simply point and click, thus executing the function associated with the MenuTool item as though the menu item had been selected directly by a user. Moreover, clicking a MenuTool item preferably does not result in the originating menu item or parent menu highlighting in any way. Likewise, if a keyboard shortcut is used to invoke the function associated with a MenuTool item, the MenuTool item preferably does not highlight in any way. It may be preferable for more complex interactions to be supported for MenuTool items such as presenting pop-up menus when clicked and held, including the ability to provide a "default" selection from the menu when the MenuTool item is single-clicked, radio button group-like behavior. A menu presentation or rotation through menu choices with each successive mouse click may also be desirable as is the ability to support other types of controls in addition to conventional controls such as buttons and the like as previously described.

In addition to the above mentioned interactions, other interactions and enhancements are possible. In accordance with one embodiment as described, MenuToolbar 860 is constrained to document windows 720. It would be desirable however, in an alternate embodiment to allow MenuToolbar 860 to be torn off from respective document window 720. Moreover, as described, MenuTool items may be clipped from the right end of MenuToolbar 860 if document window 720 is sized to a point smaller than that which will accommodate all MenuTool items. It would be desirable therefore in an alternate embodiment, to allow some form of scaling MenuToolbar 860 and its contents, to allow the entire contents to be presented regardless of the size of document window 720.

Such scaling may be described in greater detail in a related U.S. application Ser. No. 09/478,001, filed Jan. 5, 2000, now abandoned, entitled "A METHOD AND APPARATUS FOR USER INTERFACE MENU SCALING".

Figure 8E:
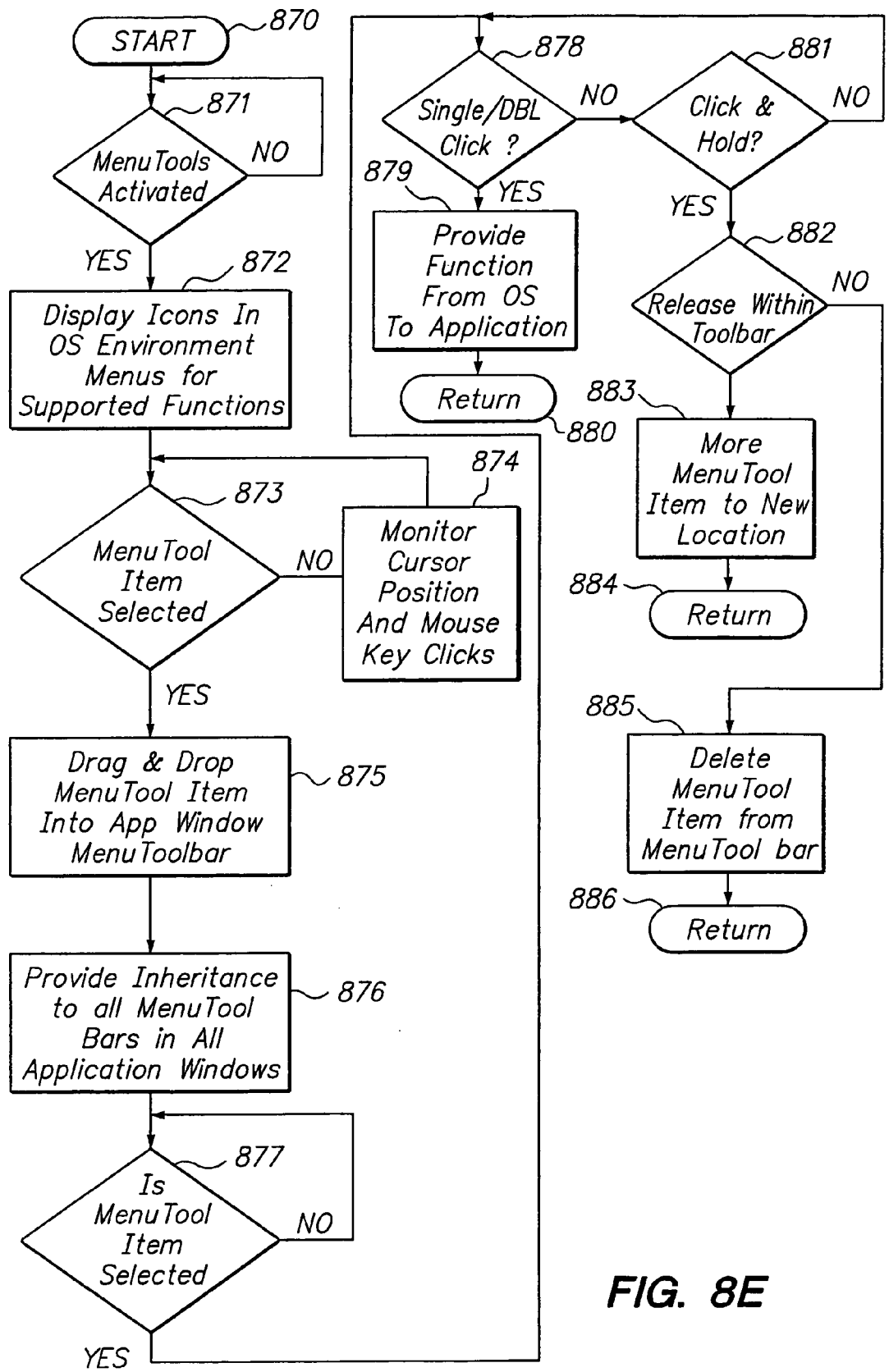
FIG. 8E is a flowchart illustrating exemplary steps to invoke MenuTools functionality in accordance with the present invention.

A flowchart illustrating exemplary steps in using MenuTools 800 in accordance with the present invention is shown in FIG. 8E. After operating system startup at step 870, activation of MenuTools 800 may be continuously checked for at step 871. If MenuTools 800 activation is detected, for example, by detecting a special input from an input device or keyboard key as described hereinabove, supported operating system functions may be displayed as menu tools alongside their respective menu items in accordance with step 872. Thereafter, the operating system may monitor the position of a cursor associated with, for example, pointer 750 and associated cursor control device buttons. When the position of the cursor and activation of cursor control device buttons corresponds to one of the displayed menu tools, the particular menu tool is deemed to have been "selected" as in step 873. Otherwise, cursor position and cursor control device buttons may continue to be monitored in step 874. Upon selection, subsequent cursor movement may have the effect of "dragging" the selected menu tool to a new position on the user interface in step 875. If the position coincides with the toolbar region of an application window the menu tool will be dropped into the toolbar also in step 875. It should be noted that since the menu tools are provided directly by the operating system, any changes, additions, deletions, and the like to a menu toolbar in one window will be "inherited" by all presently active and subsequently launched application windows in step 876. Once within the menu toolbar region of an application window, the menu tool may be selected in step 877, whereupon if the selection is by way of, for example, a "click and release" or single click interaction which is generally characteristically associated with activation as in step 878, the function associated with the menu tool may be provided directly to the application in which the toolbar of the menu tool resides. It should be appreciated that objects associated with menu tool functions, such as the contents of a document to be printed, are susceptible of being known to the operating system through various data sharing capabilities or knowledge of pertinent application objects to which the functions must be performed upon, thus the operating system may immediately begin performing the function in step 879, and may subsequently return in step 880 to, for example, step 870. Conversely, if the selection in step 877 is by way of, for example, "click and hold", or similar interaction of the kind generally associated with selection for movement, or other non-activation oriented purposes as may be detected in step 881, then step 882 may monitor for the release of the cursor control button. If the release occurs within the menu toolbar region, the menu tool may be moved to a new location in step 883 as described herein above whereafter return 884 to, for example, step 870 may occur. Otherwise, if the release occurs outside the menu toolbar region the menu tool may be deleted in step 885 whereafter return 886 may be effected to, for example, step 870. Thus such an exemplary series of steps may continue in a loop fashion for the duration of the computer session, that is until the computer system is powered off or otherwise disabled.

The invention has been described with reference to particular embodiments. However, it will be readily apparent to those skilled in the art that it is possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method in a computer system having a user interface including a display, and having an operating system including a plurality of functions, the method comprising:
    displaying at least one application window associated with an application;
    displaying interactive icons representing at least a portion of a plurality of menu items within an operating system level menu outside of the application window indicating that one or more corresponding functions of the operating system are available to the application directly from the operating system; and
    making at least one of the one or more functions of the operating system selectively available to the at least one displayed application window in response to receiving an input moving, into the application window, the corresponding one or more interactive icons located outside of the application window, such that the at least one function of the operating system is capable of operating on content of the application window upon selection of the corresponding one or more interactive icons.

2. The method of claim 1, wherein the selected interactive icon is presented in the displayed application window.

3. The method of claim 1, wherein the displayed interactive icon is presented in an operating system based menu toolbar.

4. The method of claim 3, wherein the interactive icon is user configurable.

5. The method of claim 3 wherein a copy of the interactive icon is draggable from the operating system based menu toolbar to the displayed application window.

6. A system, comprising:
    a computing device including a user interface having a display and one or more processors having an operating system which includes a plurality of functions; memory;
    one or more programs stored in memory, the one or more programs comprising instructions to:
    display at least one application window associated with an application on a display device;
    display, outside the at least one application window, interactive icons representing at least a portion of a plurality of menu items within an operating system level menu indicating that one or more corresponding functions of the operating system are available to the application directly from the operating system on a display device; and
    make at least one of the one or more functions of the operating system selectively available, by the computing device, to the at least one displayed application window in response to receiving an input moving, into the at least one application window, the corresponding one or more interactive icons outside of the application window, such that the at least one function of the operating system is capable of operating on content of the application window upon selection of the corresponding one or more interactive icons, wherein subsequently launched application windows associated with the application inherit the selected at least one function of the operating system.

7. The system of claim 6, wherein the selected interactive icon is presented in the displayed application window.

8. The system of claim 6, wherein the displayed interactive icon is presented in an operating system based menu toolbar.

9. The system of claim 8, wherein the interactive icon is user configurable.

10. The system of claim 8 wherein a copy of the interactive icon is draggable from the operating system based menu toolbar to the displayed application window.

11. An article of manufacture comprising a non-transitory computer readable medium having instructions stored thereon, that if executed by a computing device having a processor and an operating system including a plurality of operating system functions for controlling the operation of the computing device including a user interface, cause the computing device to:
    display at least one application window associated with an application;
    display interactive icons representing at least a portion of a plurality of menu items within an operating system level menu outside of the application window indicating that one or more corresponding functions of the operating system are available to the application directly from the operating system; and
    make at least one of the one or more functions of the operating system selectively available to the at least one displayed application window in response to receiving an input moving, into the at least one application window, the corresponding one or more interactive icons outside of the application window, such that the at least one function of the operating system is capable of operating on content of the application window upon selection of the corresponding one or more interactive icons.

12. The article of manufacture of claim 11, wherein the selected interactive icon is presented in the displayed application window.

13. The article of manufacture of claim 11, wherein the displayed interactive icon is presented in an operating system based menu toolbar.

14. The article of manufacturing of claim 13, wherein the interactive icon is user configurable.

15. The article of manufacture of claim 13 wherein the interactive icon is draggable from the operating system based menu toolbar to the displayed application window.

* * * * *